US010171691B2

United States Patent
Uchida et al.

(10) Patent No.: US 10,171,691 B2
(45) Date of Patent: Jan. 1, 2019

(54) DOCUMENT GENERATION SYSTEM FOR GENERATING A SECOND DOCUMENT FROM ELEMENTS EXTRACTED FROM A FIRST DOCUMENT, AND DOCUMENT SERVER, DOCUMENT GENERATION METHOD, AND COMPUTER PROGRAM

(71) Applicant: KONICA MINOLTA, INC., Chiyoda-ku, Tokyo (JP)

(72) Inventors: Hisashi Uchida, Kyoto (JP); Kazumi Sawayanagi, Itami (JP); Hidetaka Iwai, Itami (JP); Yosuke Taniguchi, Osaka (JP); Toshikazu Kawaguchi, Kobe (JP); Toshihiko Otake, Ikeda (JP); Hideaki Soejima, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 29 days.

(21) Appl. No.: 15/248,344

(22) Filed: Aug. 26, 2016

(65) Prior Publication Data
US 2017/0070623 A1 Mar. 9, 2017

(30) Foreign Application Priority Data
Sep. 3, 2015 (JP) ................... 2015-173567

(51) Int. Cl.
*H04N 1/00* (2006.01)
*G06K 9/00* (2006.01)
(Continued)

(52) U.S. Cl.
CPC ..... *H04N 1/00458* (2013.01); *G06K 9/00456* (2013.01); *H04N 1/00244* (2013.01);
(Continued)

(58) Field of Classification Search
None
See application file for complete search history.

(56) References Cited

U.S. PATENT DOCUMENTS

| 6,362,892 B1* | 3/2002 | Lee ............... G06F 3/1205 358/1.1 |
| 2002/0077832 A1* | 6/2002 | Leonid ........... G06F 17/2235 704/276 |

(Continued)

FOREIGN PATENT DOCUMENTS

| JP | 2009053928 A | 3/2009 |
| JP | 2012216038 A | 11/2012 |

(Continued)

OTHER PUBLICATIONS

Takashima et al., JP 2015-146122 [English Translation], Aug. 13, 2015, Fig 34, par 0123-0125.*

(Continued)

*Primary Examiner* — Miya J Williams
(74) *Attorney, Agent, or Firm* — Holtz, Holtz & Volek PC

(57) ABSTRACT

A document generation system which generates, from a first document in which a plurality of text groups constituted by a plurality of lines arranged in a first direction is arranged in a second direction different from the first direction, a second document includes: a ranking unit configured to rank each of the plurality of text groups according to an order in which a person reads the first document; and a generating unit configured to generate, as the second document, a document in which each of the plurality of text groups is arranged one by one in the first direction in ascending order ranked by the ranking unit.

10 Claims, 19 Drawing Sheets

(51) Int. Cl.
    *H04N 1/393*     (2006.01)
    *G06T 3/00*      (2006.01)
    *G06K 9/18*      (2006.01)
    *G06T 11/60*     (2006.01)
    *G06F 17/21*     (2006.01)
    *G06F 17/27*     (2006.01)
(52) U.S. Cl.
    CPC ......... *H04N 1/00493* (2013.01); *H04N 1/393* (2013.01); *G06F 17/212* (2013.01); *G06F 17/27* (2013.01); *G06K 9/00463* (2013.01); *G06K 9/00469* (2013.01); *G06K 9/18* (2013.01); *G06T 3/0056* (2013.01); *G06T 11/60* (2013.01); *H04N 2201/0094* (2013.01)

(56) References Cited

U.S. PATENT DOCUMENTS

2005/0195221 A1* 9/2005 Berger .................. G06F 3/0481
                                                     345/660
2009/0305685 A1* 12/2009 Takahashi ............. G06F 3/0481
                                                     455/418
2013/0259377 A1* 10/2013 Goktekin .............. G06T 3/0056
                                                     382/176
2015/0220493 A1* 8/2015 Hayashi .................... G06F 3/14
                                                     715/202
2017/0277661 A1* 9/2017 Lee ........................ G06F 17/211

FOREIGN PATENT DOCUMENTS

JP       2015106198 A       6/2015
JP       2015146122 A   *   8/2015

OTHER PUBLICATIONS

Japanese Office Action dated Oct. 24, 2017 issued in counterpart Japanese Application No. 2015-173567.
Japanese Office Action (and English language translation thereof) dated Jun. 5, 2018 issued in counterpart Japanese Application No. 2015-173567.

* cited by examiner

DOCUMENT GENERATION SYSTEM FOR GENERATING A SECOND DOCUMENT FROM ELEMENTS EXTRACTED FROM A FIRST DOCUMENT, AND DOCUMENT SERVER, DOCUMENT GENERATION METHOD, AND COMPUTER PROGRAM

The entire disclosure of Japanese Patent Application No. 2015-173567 filed on Sep. 3, 2015 including description, claims, drawings, and abstract are incorporated herein by reference in its entirety.

BACKGROUND OF THE INVENTION

Field of the Invention

The present invention relates to a technique for generating a document.

Description of the Related Art

Conventionally, there has been presented a technique for displaying a document in a small size display surface, such as a display surface of a smart phone.

The document image output device disclosed in JP 2012-216038 A analyzes a layout of image data imported from a document, and divides a text part for each line. The document image output device searches a position where it is highly possible to be a phrase or punctuation in each line image data, and divides the line image data at the position.

The information processing apparatus disclosed in JP 2015-106198 A divides, into multiple logic pages, a scanned image read from a document in which images are printed in Nin1 or saddle stitching format, and sequentially displays the logic pages one by one.

Column setting is one of document formats. The column setting is a format to arrange content of a document by dividing the content into multiple columns.

When a user browses a column setting document being displayed on a small size display surface, the user normally enlarges a column to which the user pays attention to full width of the display surface and reads character strings in the column. For example, when the document is written horizontally and has two columns of a left column and a right column, the left column or the right column is enlarged. By enlarging the column, the characters are largely displayed and easily read. However, a part of the column to which the user pays attention is not displayed.

When paying attention to the left column and continuing reading downward from the top, the user moves the document upward to display the lower part of the left column which is not displayed. Then, when having read the end of the left column, the user moves the document so as to display the beginning of the right column to continue reading. At this time, the user needs to move the document, at least, leftward. If the upper part of the document is not displayed, the beginning of the right column is not displayed yet by being moved only leftward, and the user also needs to move the document downward.

As described above, when a column setting document is browsed while being displayed on a small size display surface, the document has been normally enlarged or moved vertically or horizontally. It is troublesome to browse a document while performing various operations.

The technique disclosed in JP 2012-216038 A does not deal with a column setting document and cannot solve the above described problem which is caused when a column setting document is browsed.

The information processing apparatus disclosed in JP 2015-106198 A sequentially displays multiple logic pages of an Nin1 scanned image one by one as described above. For example, when a 2in1 scanned image is displayed, two logic page integrated into one page are sequentially displayed one by one.

The 2in1 scanned image is equivalent to a column setting document having two columns, and the logic page of the scanned image is equivalent to a column of the column setting document. According to the information processing apparatus disclosed in JP 2015-106198 A, multiple columns in a column setting document is sequentially displayed one by one. In other words, any one of the columns is displayed on the display surface.

The user can display and browse the column which the user desires to browse by performing operation to switch screens. However, it is desirable for a user to easily browse such a document.

SUMMARY OF THE INVENTION

The present invention has been made in consideration of the above problems, and an object thereof is to browse a column setting document on a display having a small display surface more easily than before.

To achieve the abovementioned object, according to an aspect, a document generation system which generates, from a first document in which a plurality of text groups constituted by a plurality of lines arranged in a first direction is arranged in a second direction different from the first direction, a second document, reflecting one aspect of the present invention comprises: a ranking unit configured to rank each of the plurality of text groups according to an order in which a person reads the first document; and a generating unit configured to generate, as the second document, a document in which each of the plurality of text groups is arranged one by one in the first direction in ascending order ranked by the ranking unit.

The generating unit preferably generates the second document by enlarging or reducing each of the plurality of text groups so as to be matched with a length of the second direction. Furthermore, the document generation system further preferably comprises a display control unit configured to display the second document on a display unit.

Furthermore, the document generation system further preferably comprises: an extracting unit configured to extract a graphic arranged in the first document, and the generating unit preferably generates, as the second document, a document including the graphic being separated from the plurality of text groups.

Furthermore, the document generation system further preferably comprises a display control unit configured to display the second document on a display unit by displaying a screen in which the plurality of text groups and the graphic are each arranged in an area to be independently scrolled.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

First Embodiment

Figure 1:
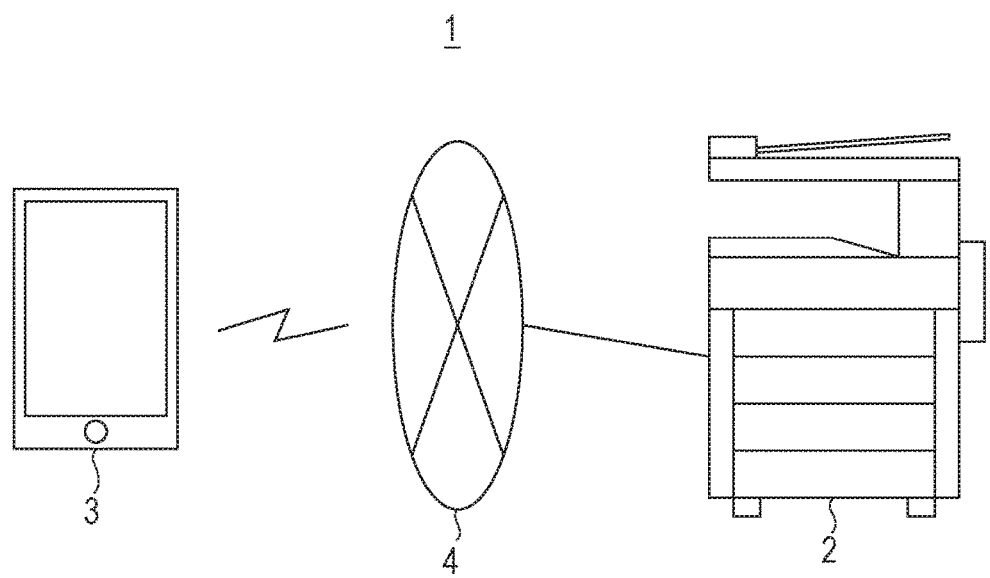
FIG. 1 is a diagram illustrating an example of a configuration of an entire document display system.
Figure 2:
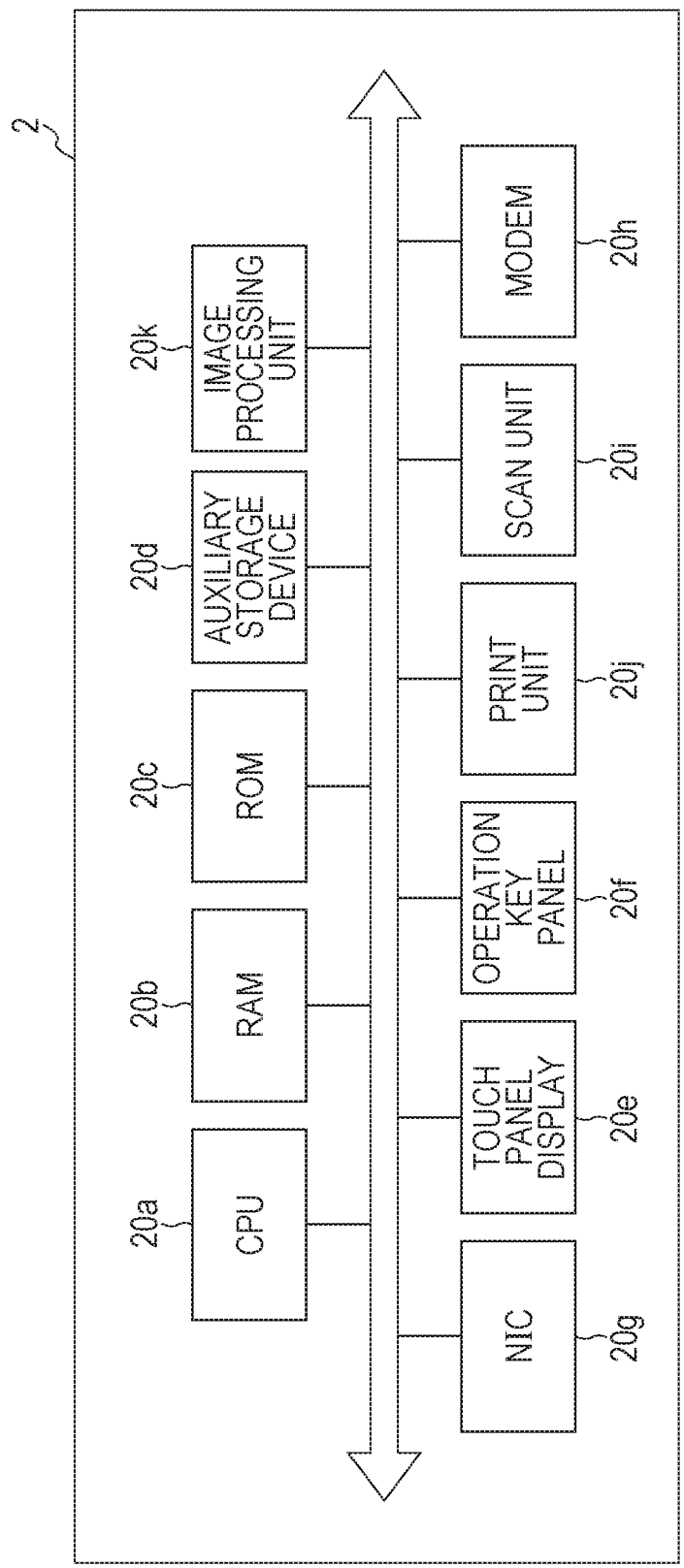
FIG. 2 is a diagram illustrating an example of a hardware configuration of an image forming apparatus.
Figure 3:
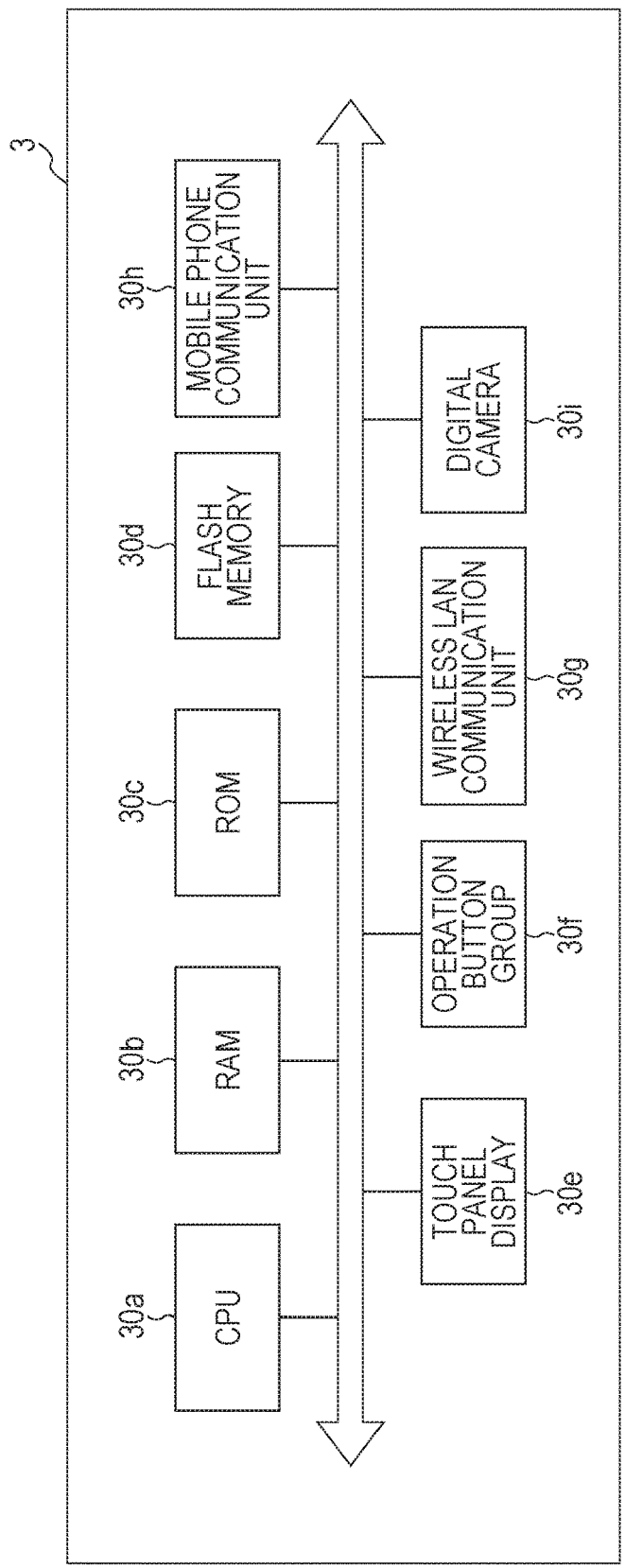
FIG. 3 is a diagram illustrating an example of a hardware configuration of a terminal device.

FIG. 1 is a diagram illustrating an example of a configuration of an entire document display system 1. FIG. 2 is a diagram illustrating an example of a hardware configuration of an image forming apparatus 2. FIG. 3 is a diagram illustrating an example of a hardware configuration of a terminal device 3.

As illustrated in FIG. 1, the document display system 1 includes an image forming apparatus 2, a terminal device 3, and a communication line 4. The document display system 1 manages a large number of documents, and provides a document specified by a user.

The image forming apparatus 2 and the terminal device 3 can communicate with each other via the communication line 4. As the communication line 4, a local area network (LAN) line, the internet, a land phone line, or a mobile phone line is used.

The image forming apparatus 2 is an apparatus in which functions, such as copy, network printing, facsimile, and scanning, are integrated. The image forming apparatus 2 is generally called a "complex machine", a "multi-functional peripheral (MFP)" or the like.

The image forming apparatus 2 includes, as illustrated in FIG. 2, a central processing unit (CPU) $20a$, a random access memory (RAN) $20b$, a read only memory (RON) $20c$, an auxiliary storage device $20d$, a touch panel display $20e$, an operation key panel $20f$, a network interface card (NIC) $20g$, a modem $20h$, a scan unit $20i$, a print unit $20j$, and an image processing unit $20k$.

The touch panel display $20e$ displays a screen to show a message to a user, a screen for the user to input a command or information, a screen to show a result of processing performed by the CPU $20a$, and the like. Furthermore, the touch panel display $20e$ transmits a signal indicating a touched position to the CPU $20a$.

The operation key panel $20f$ is what is called a hardware keyboard, and includes a numeric key, a start key, a stop key, and a function key.

The NIC $20g$ communicates with the terminal device 3 in accordance with a protocol, such as a Transmission Control Protocol/Internet Protocol (TCP/IP).

The modem $20h$ exchanges image data with a facsimile terminal in accordance with a protocol, such as a G3.

The scan unit $20i$ reads an image shown in a sheet placed on a platen glass, and generates image data.

The print unit $20j$ prints the image read by the scan unit $20i$. Furthermore, the print unit $20j$ performs network printing. In other words, the print unit $20j$ prints an image on a sheet based on the data received from a personal computer by the NIC $20g$. In addition, the print unit $20j$ prints an image on a sheet based on the data received from a facsimile terminal by the modem $20h$.

The image processing unit $20k$ performs, to the image data acquired by the NIC $20g$, the modem $20h$, or the scan unit $20i$, processing, such as conversion of the resolution, inclination correction, and top-and-bottom correction.

In the ROM $20c$ or the auxiliary storage device $20d$, programs to implement the above copy and network printing functions are stored. Furthermore, a document providing program 20P is stored.

The document providing program 20P is a program to manage various documents and provide a document to the terminal device 3 in response to a request of the user. Furthermore, according to the document providing program 20P, it is possible to provide a column setting document by changing the layout and the like so that the user browses the document on a display having a small size display surface more easily than before. This mechanism will be described later. Note that, hereinafter, the document before change, that is, the original document is referred to as an "original document", and the document after the change is referred to as a "customized document".

These programs are loaded in the RAN $20b$ as needed, and executed by the CPU $20a$. As the auxiliary storage device $20d$, a hard disk drive, a solid state drive (SSD), or the like is used.

The terminal device 3 is a client for the user to remotely receive various services provided by the image forming apparatus 2. The terminal device 3 is used to browse the document provided by the image forming apparatus 2. As the terminal device 3, a portable information device, such as a smart phone or a tablet computer is used. The case in which a smart phone is used as the terminal device 3 is described below.

The terminal device 3 includes, as illustrated in FIG. 3, a CPU 30*a*, a RAM 30*b*, a ROM 30*c*, a flash memory 30*d*, a touch panel display 30*e*, an operation button group 30*f*, a wireless LAN communication unit 30*g*, a mobile phone communication unit 30*h*, and a digital camera 30*i*.

The touch panel display 30*e* displays a screen to show a message to the user, a screen to show a result of processing, a screen for the user to input an instruction, or the like. Furthermore, the touch panel display 30*e* detects a touched position, and notifies the CPU 30*a* of the position.

The display surface size of the touch panel display 30*e* is about 5 to 6 inches, and is smaller than the display surface size of a display of a desk-top or lap-top personal computer (generally, 15 inches or more).

The operation button group 30*f* includes a button to return to what is called a home screen, a button to adjust volume, and a button to switch the power on and off.

The wireless LAN communication unit 30*g* performs communication based on the specification of a wireless LAN, that is, the specification of the Institute of Electrical and Electronics Engineers (IEEE) 802.11.

The mobile phone communication unit 30*h* performs communication based on the specification of the Code Division Multiple Access (CDMA) 2000, Wideband-CDMA (W-CDMA), or Long Term, Evolution (LTE) via a mobile phone line. The digital camera 30*i* photographs an image and generates image data.

In the ROM 30*c* or the flash memory 30*d*, programs, in addition to an operating system of the terminal device 3, an application to generate a document (for example, word-processing software), a mailer, a web browser, and the like are stored.

Furthermore, a document display program, 30P is stored in the ROM 30*c* or the flash memory 30*d*. The document display program 30P is a program to receive data of a document from the image forming apparatus 2 and display the document.

These programs are loaded in the RAM 30*b* as needed, and executed by the CPU 30*a*.

Figure 4:
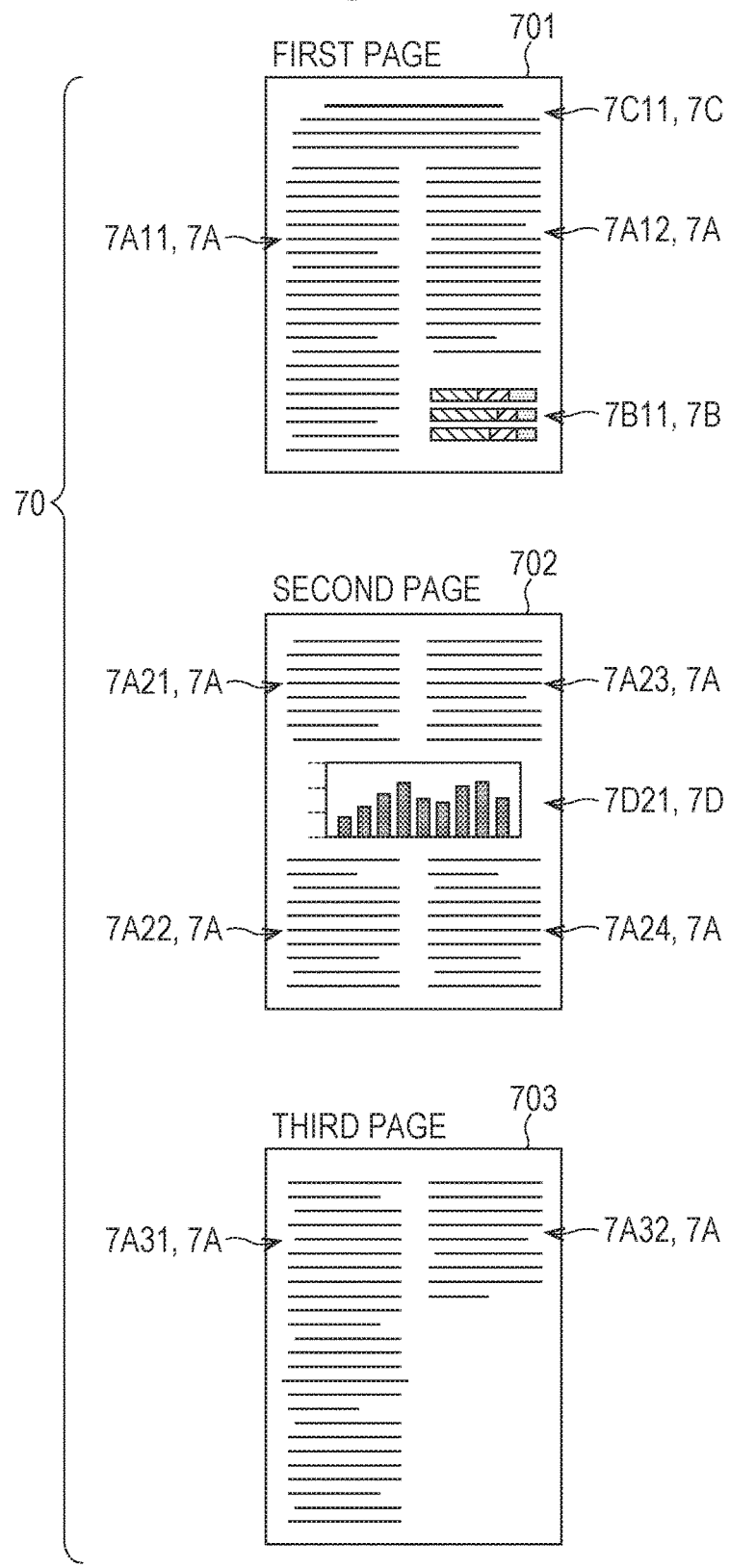
FIG. 4 is a diagram illustrating an example of an original document.
Figure 5:
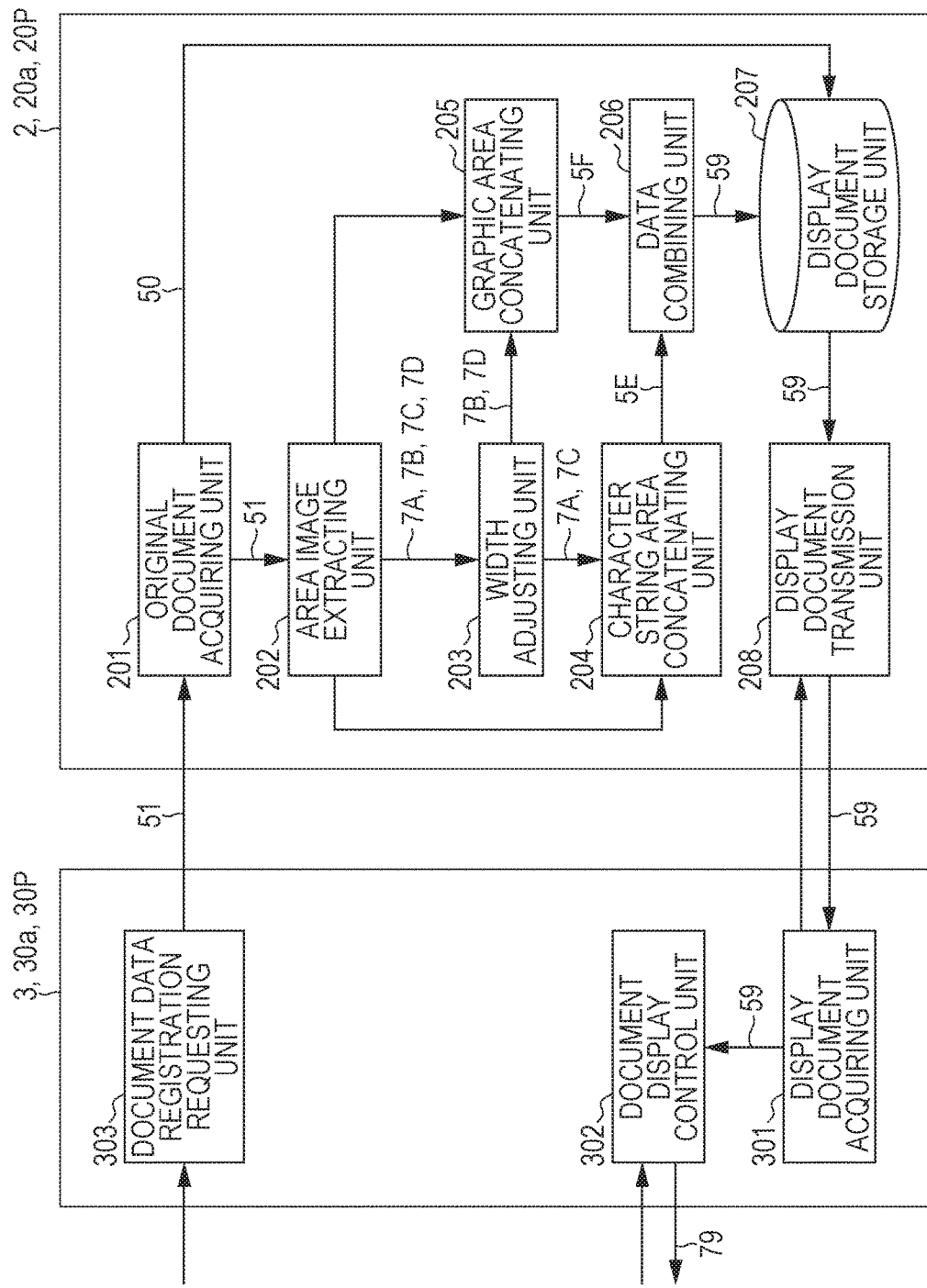
FIG. 5 is a diagram illustrating an example of functional configurations of an image forming apparatus and a terminal device in a first embodiment.

FIG. 4 is a diagram illustrating an example of an original document 70. FIG. 5 is a diagram illustrating an example of functional configurations of the image forming apparatus 2 and the terminal device 3 in the first embodiment.

The case in which the layout and the like of the original document 70 illustrated in FIG. 4 is changed to be matched with the terminal device 3 and provided to the terminal device 3 is described below.

The original document 70 in FIG. 4 is constituted by three pages of a first page 701, a second page 702, and a third page 703 from the top. Page numbers of "1", "2", and "3" are attached to the first page 701, the second page 702, and the third page 703 respectively. Note that, character strings are indicated by lines in FIG. 4, and FIGS. 6 to 9, FIGS. 12A and 12B, and FIG. 13, which will be described later.

These pages are divided into two columns of a right column and a left column. Furthermore, what is called a spread area is arranged over two columns. Hereinafter, a column at a left side is referred to as a "left column", and a column at a right side is referred to as a "right column".

Then, main content of the original document 70 is divided and arranged in the order of the left column and the right column of the first page 701, the left column and the right column of the second page 702, and the left column and the right column of the third page 703.

Furthermore, sub content is arranged over the left column and the right column, that is, in a spread format in the first page 701 and the second page 702.

These two items of content are expressed by a text object or a graphic object. The text object is an object constituted only by character strings. The graphic object is an object including an element other than character string, such as a chart, a table, a graph, a line drawing, an illustration, or a photograph.

Hereinafter, in the objects contained in the main content, the text object is referred to as a "text object 7A", and the graphic object is referred to as a "graphic object 7B".

Furthermore, in the sub content, the content which is the text object is referred to as "text content 7C", and the content which is the graphic object is referred to as "graphic content 7D".

In the upper part of the first page 701, text content 7C11, which is the title and summary of the original document 70, is arranged as the text content 7C. Furthermore, in the lower part of the right column of the first page 701, a graphic object 7B11 is arranged as the graphic object 7B. In the left column and the right column, a text object 7A11 and a text object 7A12 are arranged respectively as the text object 72A.

In the center part of the second page 702 in the vertical direction, graphic content 7D21 is arranged as the graphic content 7D. The left column and the right column are divided into the upper and lower parts by the graphic content 7D. As the text object 7A, a text object 7A21 is arranged in the upper part area of the divided left column, and a text object 7A22 is arranged in the lower part area. A text object 7A23 is arranged in the upper part area of the divided right column, and a text object 7A24 is arranged in the lower part area.

In the left column and the right column of the third page 703, a text object 7A31 and a text object 7A32 are arranged respectively as the text object 7A.

According to the document providing program 20P, it is possible to implement, in the image forming apparatus 2, functions of an original document acquiring unit 201, an area image extracting unit 202, a width adjusting unit 203, a character string area concatenating unit 204, a graphic area concatenating unit 205, a data combining unit 206, a display document storage unit 207, and a display document transmission unit 208, which are illustrated in FIG. 5.

According to the document display program 30P, it is possible to implement, in the terminal device 3, functions of a display document acquiring unit 301, a document display control unit 302, and a document data registration requesting unit 303, which are illustrated in FIG. 5.

[Processing to Prepare Browsing Data]

Figure 6:
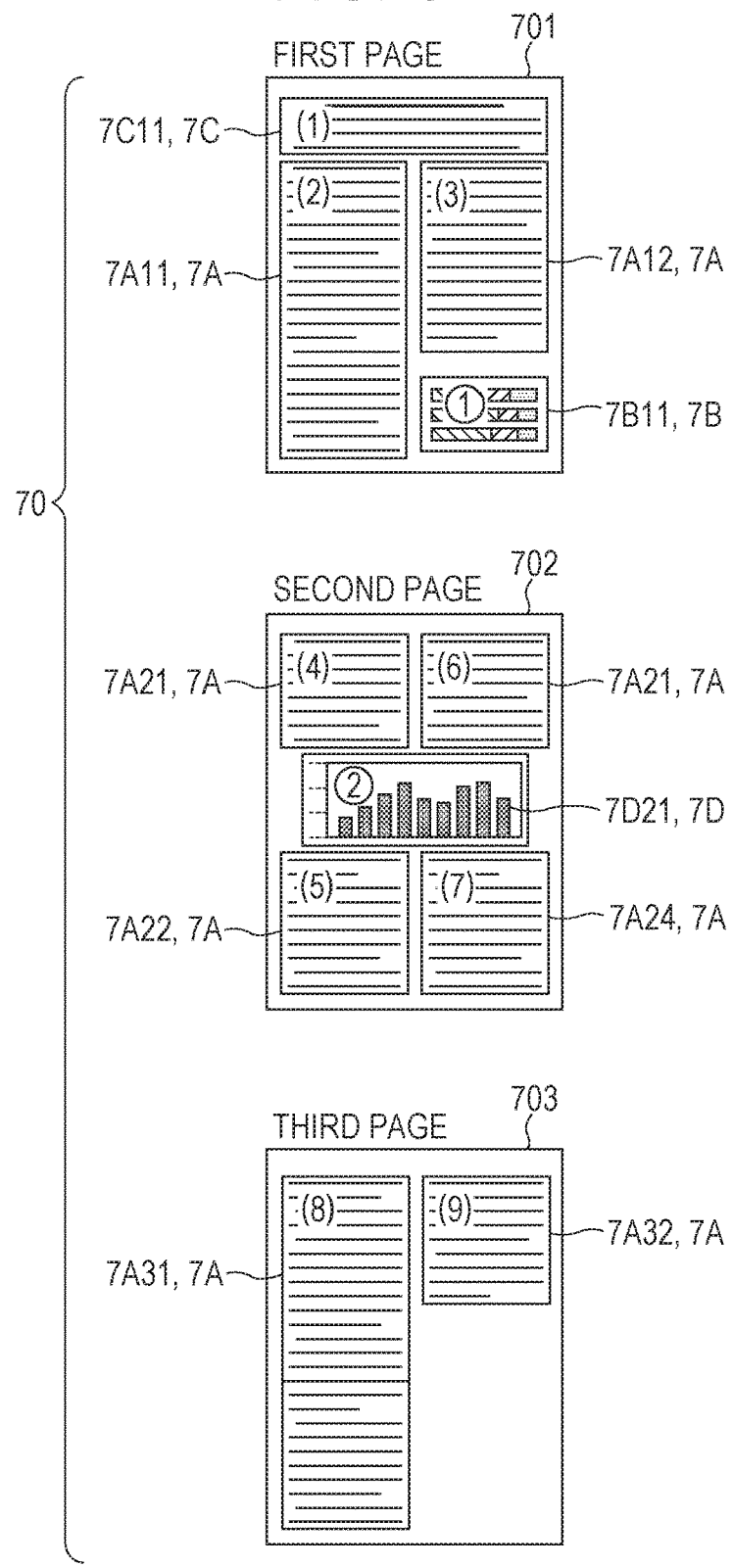
FIG. 6 is a diagram illustrating an example of extraction of an area in an original document.
Figure 7:
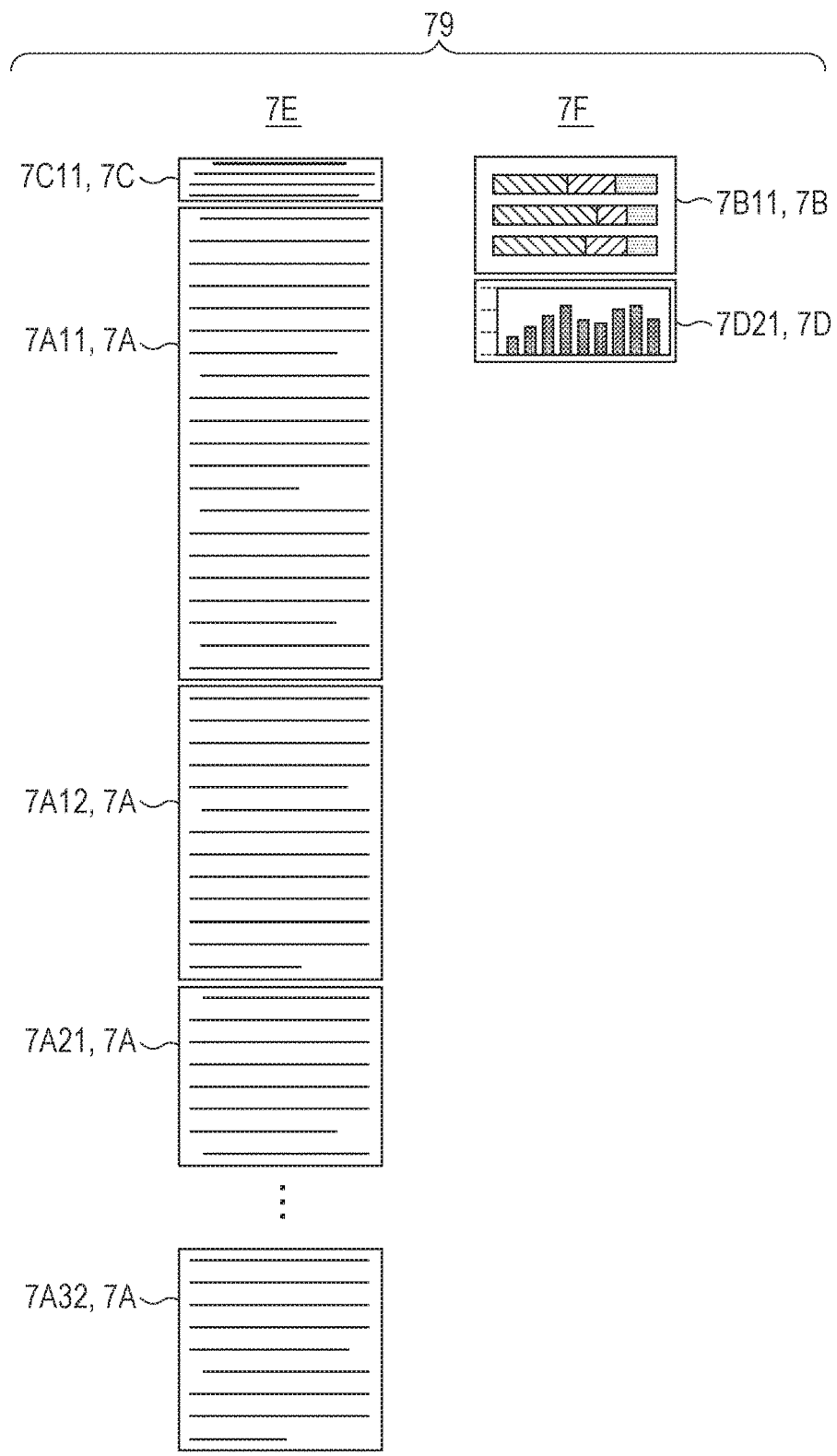
FIG. 7 is a diagram illustrating an example of a configuration of a customized document.

FIG. 6 is a diagram illustrating an example of extraction of an area in the original document 70. FIG. 7 is a diagram illustrating an example of a configuration of a customized document 79.

In the display document storage unit 207, a pair of original document data 50 and customized document data 59 is stored for each document.

The original document data 50 is data to display the original document 70 without changing the layout. The customized document data 59 is data to display a document after changing the layout and the like of the original document 70 (a customized document 79 which will be described later).

The original document data 50 and the customized document data 59 are generated by the original document acquiring unit 201, the area image extracting unit 202, the width adjusting unit 203, the character string area concatenating unit 204, the graphic area concatenating unit 205, and the data combining unit 206, and registered in the display document storage unit 207. The processing of the units is described below in the case in which the original document data 50 and the customized document data 59 of the original document 70 illustrated in FIG. 4 are registered.

The user generates the original document 70 with word-processing software or the like installed in the terminal device 3, and saves the document as a file 51. Then, the user inputs a predetermined command.

Thereafter, the document data registration requesting unit 303 requests the image forming apparatus 2 to register the document. At this time, the file 51 is uploaded to the image forming apparatus 2.

When receiving the file 51 from the terminal device 3, the original document acquiring unit 201 of the image forming apparatus 2 stores the file 51 in the display document storage unit 207 as the original document data 50. At this time, a document name is attached to the original document data 50 to identify the original document 70. The document name may be specified by the user, or issued by the original document acquiring unit 201.

The file 51 may be uploaded from a device other than the terminal device 3, or input to the document display system 1 via a recording medium, such as a universal serial bus (USB) memory.

The area image extracting unit 202 extracts, based on the file 51, area images from the pages of the original document 70, that is, from the first page 701, the second page 702, and the third page 703. The area image is an image constituted by multiple colored pixels. These colored pixels are arranged within a predetermined distance from any one of other colored pixels.

According to the processing of the area image extracting unit 202, eight text objects 7A (7A11, 7A12, 7A21, 7A22, 7A23, 7A24, 7A31, and 7A32), one graphic object 7B (7B11), one item of text content 7C (7C11), and one item of graphic content 7D (7D21) are extracted from the original document 70 as the area images.

Furthermore, the area image extracting unit 202 distinguishes the type (text or graphic) of the extracted area image.

Then, the area image extracting unit 202 determines, based on the following rules (1-1) to (1-3), ranks of the text objects 7A and the text content 7C among the extracted area images. This rank indicates the order to read the original document 70. Furthermore, the rank is used for concatenation, which will be described later.

(1-1) A higher rank is preferentially given to an area image having a smaller page number of the page in which the area image is arranged.

(1-2) With regard to area images arranged in the same page, a higher rank is given to an area image the entire of or a part of which is arranged in the left side column compared to the others.

(1-3) If there are area images having the same rank based on (1-2), a higher rank is given to an area image arranged in upper part than the others.

Furthermore, the area image extracting unit 202 similarly determines ranks the graphic object 7B and the graphic content 7D based on the above rules (1-1) to (1-3). Note that, the ranks of the graphic object 7B and the graphic content 7D are different from the ranks of the text objects 7A and the text content 7C.

As the result of the processing to determine the ranks of the area images by the area image extracting unit 202, the ranks of the text objects 7A and the text content 7C which are extracted from the original document 70 are determined as the numbers enclosed in parentheses in FIG. 6. Furthermore, the ranks of the graphic object 7B and the graphic content 7D which are extracted from the original document 70 are determined as the numbers surrounded by circles in FIG. 6.

The area image extraction and the type distinction by the area image extracting unit 202 can be implemented by a known technique. When the file 51 has information indicating the layout and the attribute of the content similar to the portable document format (PDF) data, the area image extraction and the type distinction may be performed based on the information.

The width adjusting unit 203 enlarges or reduces the area images extracted by the area image extracting unit 202 so that their widths are matched with the number of pixels of the long side or the short side of the display surface of the touch panel display 30e of the terminal device 3. The "width" is the number of pixels in the direction parallel to the character strings. In other words, the width of the original document 70 written horizontally is the number of pixels of the horizontal direction, and the width of the original document 70 written vertically is the number of pixels of the vertical direction. Whether the width is matched with the number of pixels of either of the long side or the short side may be specified by the user, or determined in advance. Alternatively, the width may be matched with the number of pixels of the long side or the short side of a standard display of a smart phone. It is desirable that the aspect ratio of the area image cannot be changed by the reduction and enlargement. Whether the original document 70 is written horizontally or vertically can be distinguished by a known method.

The character string area concatenating unit 204 concatenates the text objects 7A and the text content 7C among the area images whose widths are adjusted by the width adjusting unit 203 in ascending order of the ranks determined by the area image extracting unit 202. However, when the width is the horizontal direction, the character string area concatenating unit 204 concatenates the text objects 7A and the text content 7C from top to bottom. When the width is the vertical direction, the character string area concatenating unit 204 concatenates the text objects 7A and the text content 7C from right to left. Thus, in the example of FIG. 4, the text objects 7A and the text content 7C are concatenated as illustrated in FIG. 7. Hereinafter, the image obtained by the concatenation is referred to as a "text concatenated image 7E", and the image data to display the text concatenated image 7E is referred to as "text concatenated image data 5E".

The graphic area concatenating unit 205 concatenates the graphic object 7B and the graphic content 7D whose widths are adjusted by the width adjusting unit 203 in ascending order of the ranks determined by the area image extracting unit 202. The direction of the concatenation is the same as the direction of the concatenation by the character string area concatenating unit 204. Thus, as illustrated in FIG. 7, the graphic object 7B and the graphic content 7D are concatenated. Hereinafter, the image obtained by the concatenation is referred to as a "graphic concatenated image 7F", and the image data thereof is referred to as "graphic concatenated image data 5E".

The data combining unit 206 combines the text concatenated image data 5E and the graphic concatenated image data 5F into one file, and generates the customized document data 59 by attaching the document name of the original document 70 as the file name.

When generating the customized document data 59, the data combining unit 206 attaches, to data of each of the text objects 7A and the text content 7C constituting the text concatenated image 7E, the page number of the page to which each of the text objects 7A and the text content 7C belongs in the original document 70. Similarly, the data combining unit 206 attaches, to data of each of the graphic object 7B and the graphic content 7D constituting the graphic concatenated image 7F, the page number of the page to which each of the graphic object 7B and the graphic content 7D belongs in the original document 70. Furthermore, the data combining unit 206 attaches direction information indicating the original document 70 is written horizontally or vertically.

Then, the data combining unit 206 stores the customized document data 59 in the display document storage unit 207.

Note that, when the original document 70 neither includes the graphic object 7B nor the graphic content 7D, the graphic area concatenating unit 205 does not generate the graphic concatenated image data 5F. Then, the data combining unit 206 generates the customized document data 59 without combining the text concatenated image data 5E and the graphic concatenated image data 5F.

[Processing to Browse]

Figure 8:
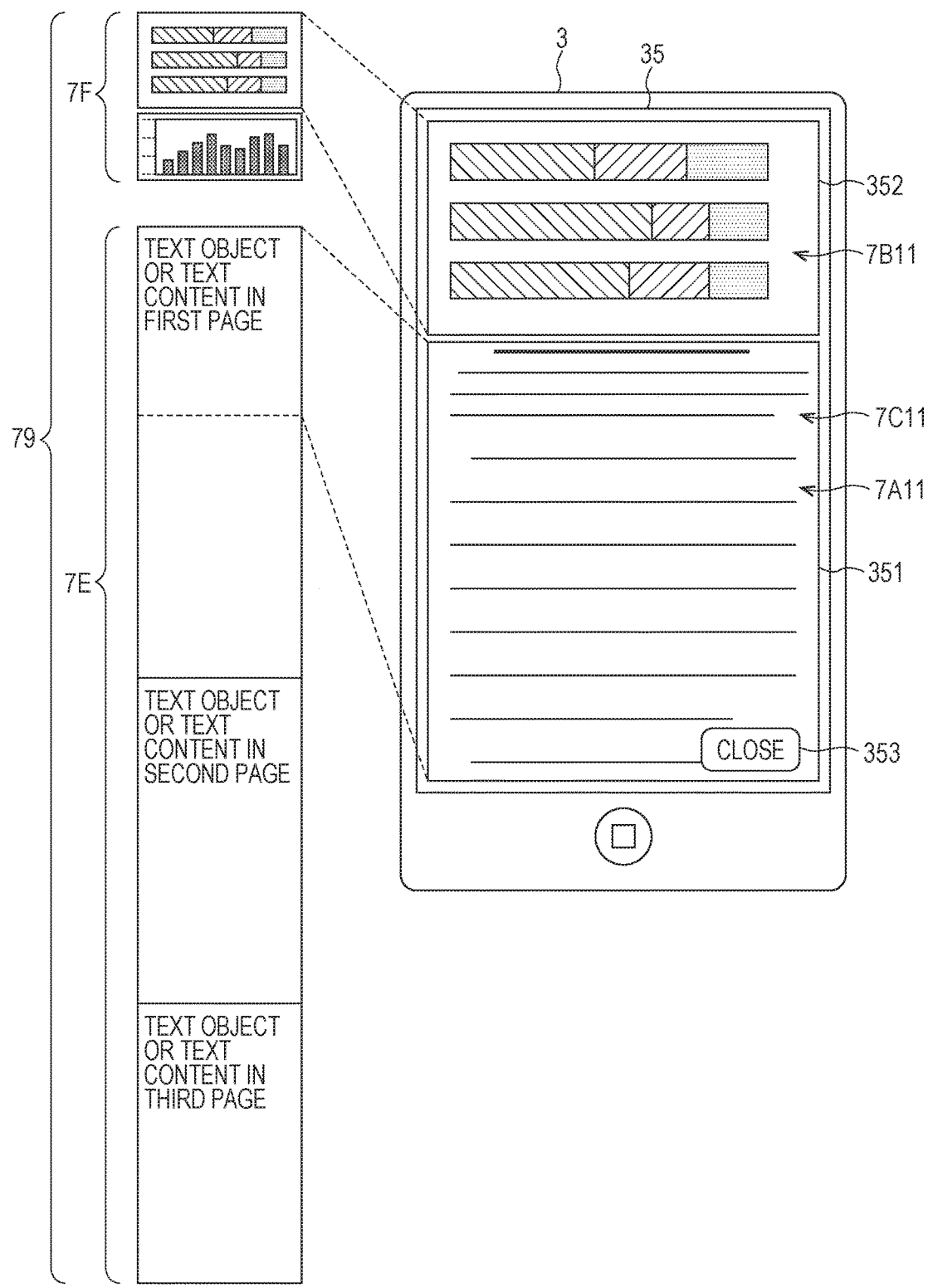
FIG. 8 is a diagram illustrating an example of display of the customized document.
Figure 9:
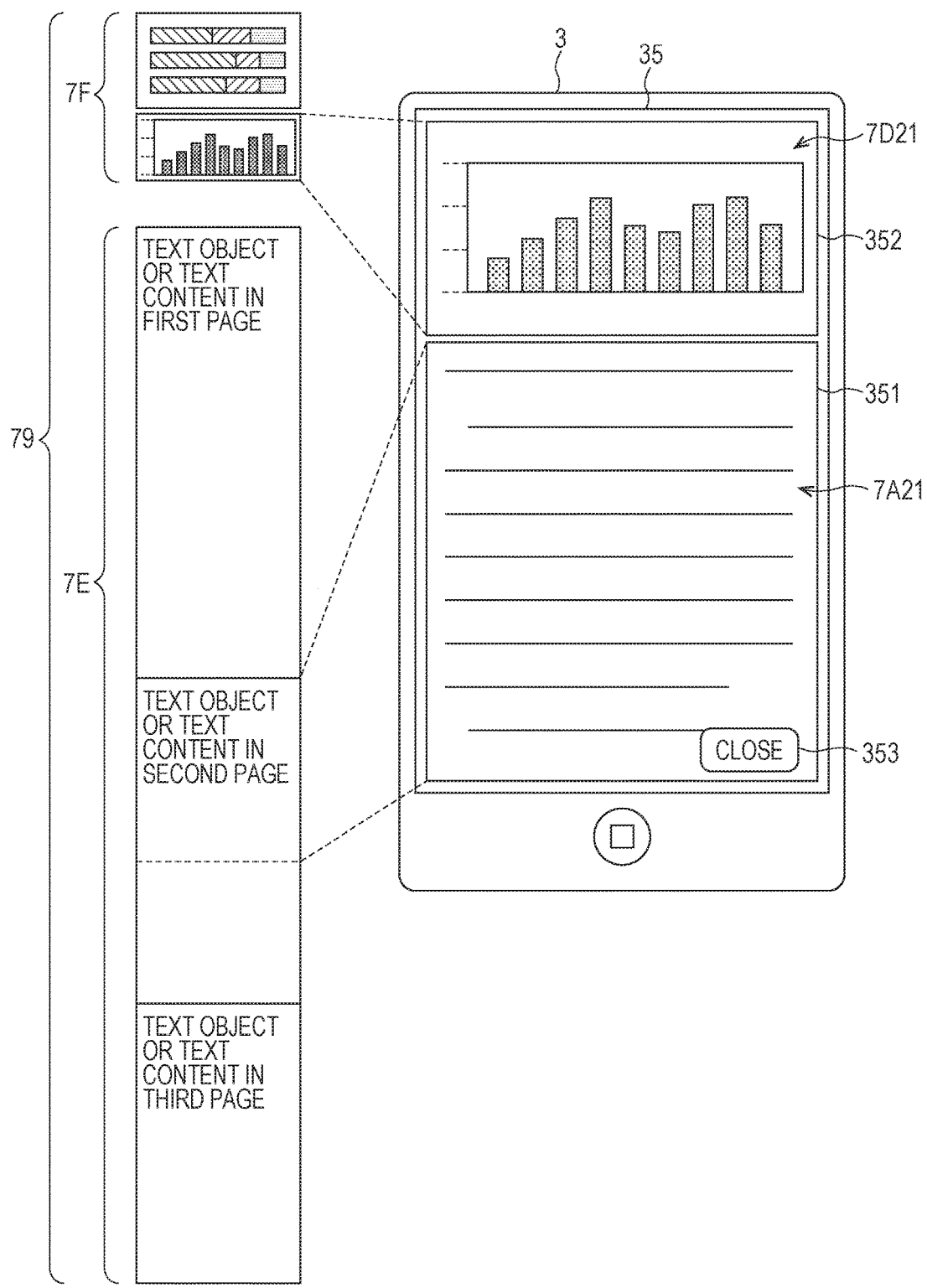
FIG. 9 is a diagram illustrating an example of display of the customized document.

FIGS. 8 and 9 are diagrams illustrating examples of display of the customized document 79.

The user starts the document display program 30P in the terminal device 3, and inputs the document name to browse the document. The case in which the document name of the original document 70 illustrated in FIG. 4 is input is described below.

The display document acquiring unit 301 of the terminal device 3 requests the image forming apparatus 2 to transmit the customized document data 59 corresponding to the document name input by the user, and receives the customized document data 59. At this time, the display document acquiring unit 301 notifies the image forming apparatus 2 of the document name.

Then, the display document transmission unit 208 of the image forming apparatus 2 reads, from the display document storage unit 207, the customized document data 59 corresponding to the notified document name, and transmits the customized document data 59 to the terminal device 3.

The document display control unit 302 of the terminal device 3 displays, based on the received customized document data 59, the customized document 79 on the touch panel display 30e. The details are as follows.

The document display control unit 302 displays, as illustrated in FIGS. 8 and 9, a document screen 35 on the touch panel display 30e. The document screen 35 includes a character string display area 351, a graphic display area 352, and a close button 353. The character string display area 351 is an area to display the text concatenated image 7E. The graphic display area 352 is an area to display the graphic concatenated image 7F. The close button 353 is a button to close the document screen 35. When the customized document data 59 indicates that the document is written horizontally, the character string display area 351 and the graphic display area 352 are arranged vertically. On the other hand, the customized document data 59 indicates that the document is written vertically, the character string display area 351 and the graphic display area 352 are arranged horizontally.

Then, the document display control unit 302 displays the text concatenated image 7E in the character string display area 351 based on the text concatenated image data 5E in the customized document data 59, and displays the graphic concatenated image 7F in the graphic display area 352 based on the graphic concatenated image data 5F. At this time, the text concatenated image 7E is enlarged or reduced so that the width of the text concatenated image 7E is matched with the width of the character string display area 351. Similarly, the graphic concatenated image 7F is enlarged or reduced so that the width of the graphic concatenated image 7F is matched with the width of the graphic display area 352.

There is a case in which only a part of the text concatenated image 7E can be displayed in the character string display area 351. In this case, at the beginning when displaying the customized document data 59, the document display control unit 302 displays the text concatenated image 7E by matching the upper end of the text concatenated image 7E with the upper end of the character string display area 351 as illustrated in FIG. 8.

When the user touches and flicks or drags the character string display area 351 upward, the document display control unit 302 scrolls the text concatenated image 7E upward. Thus, the lower part of the text concatenated image 7E than the currently displayed part is displayed.

Then, when the user flicks or drags the character string display area 351 downward, the document display control unit 302 scrolls the text concatenated image 7E downward. Thus, the upper part of the text concatenated image 7E than the currently displayed part is displayed.

Furthermore, the document display control unit 302 displays, in the graphic display area 352, the graphic object 7B or the graphic content 7D in the page corresponding to the part displayed in the character string display area 351. When the corresponding page is changed by the scroll of the text concatenated image 7E, the graphic object 7B or the graphic content 7D in the page after the change is displayed in the graphic display area 352 instead of the graphic object 7B or the graphic content 7D displayed before the change.

When the page after the change neither includes the graphic object 7B nor the graphic content 7D, the graphic object 7B or the graphic content 7D in the page before the change remains displayed. Alternatively, nothing may be displayed in the graphic display area 352.

Furthermore, when the entire graphic concatenated image 7F cannot be displayed in the graphic display area 352, the document display control unit 302 displays a part of the graphic concatenated image 7F. Then, the graphic concatenated image 7F is scrolled in the graphic display area 352 in response to the user's operation.

Note that, the customized document data 59 indicates that each of the text objects 77A, the graphic object 7B, the text content 7C, and the graphic content 7D corresponds to which page.

For example, at the beginning when displaying the customized document data 59, the document display control unit 302 displays the graphic object 7B or the graphic content 7D in the first page 701 (here, the graphic object 7B11) in the graphic display area 352 in association with displaying the text objects 7A or the text content 7C in the first page 701 in the character string display area 351 as illustrated in FIG. 8.

Then, the document display control unit 302 displays the graphic object 7B or the graphic content 7D in the second page 702 (here, the graphic content 7D21) in the graphic display area 352 in association with displaying the text objects 7A or the text content 7C in the second page 702 in the character string display area 351 by the scroll of the text concatenated image 7E as illustrated in FIG. 9. The display of the graphic object 7B or the graphic content 7D to be displayed in the graphic display area 352 may be switched when the page displayed in the character string display area 351 is completely changed, or when the next page starting to be displayed exceeds a predetermined ratio (for example, 50%) of the character string display area 351.

Note that, when the customized document data 59 does not include the graphic concatenated image data 5F, the document display control unit 302 does not have the graphic display area 352 in the document screen 35, and uses the whole display surface as the character string display area 351.

When the user touches the close button 353, the document display control unit 302 closes the document screen 35.

Figure 10:
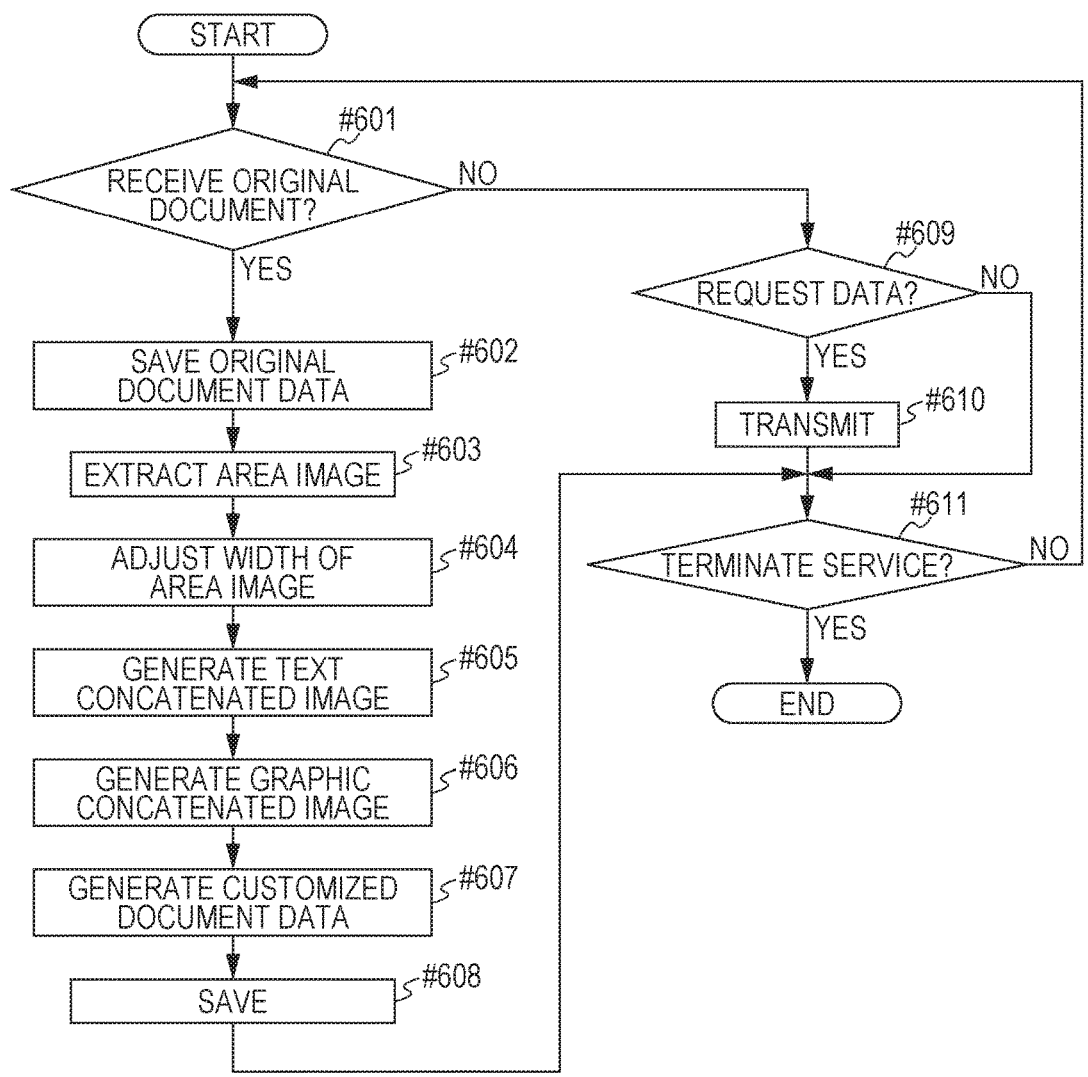
FIG. 10 is a flowchart explaining processing of the image forming apparatus in the first embodiment.
Figure 11:
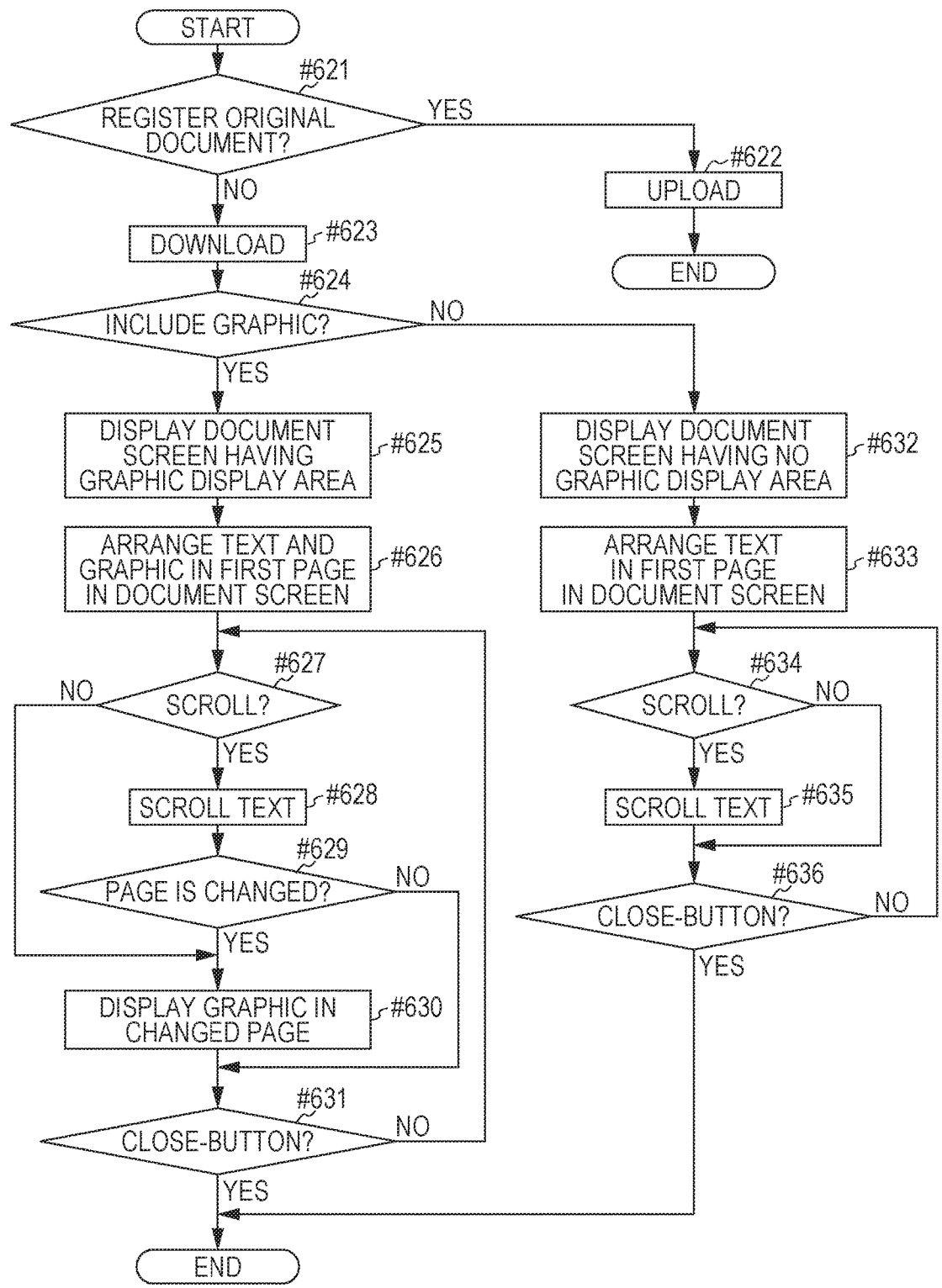
FIG. 11 is a flowchart explaining processing of the terminal device in the first embodiment.

FIG. 10 is a flowchart explaining processing of the image forming apparatus 2 in the first embodiment. FIG. 11 is a flowchart explaining processing of the terminal device 3 in the first embodiment.

Next, the overall processing of the document providing program 20P and the document display program 30P is described with reference to the flowchart.

The image forming apparatus 2 performs the processing based on the document providing program 20P with the procedures illustrated in FIG. 10.

When receiving the file 51 from another device (for example, the terminal device 3) (YES in #601), the image forming apparatus 2 performing the processing to save the file 51 as the original document data 50 after attaching the document name (#602), and to generate and save the customized document data 59.

The image forming apparatus 2 extracts, based on the file 51, the text objects 7A, the graphic object 7B, the text content 7C, and the graphic content 7D from the pages (the first page 701, the second page 702, and the third page 703) of the original document 70 as the area images (#603), and adjusts the widths of these area images (#604).

The image forming apparatus 2 ranks each of the text objects 7A and the text content 7C, and generates the text concatenated image data 5E of the text concatenated image 7E by concatenating the text objects 7A and the text content 7C so that its rank is higher, arranged in upper part (#605). Similarly, the image forming apparatus 2 ranks each of the graphic object 7B and the graphic content 7D, and generates the graphic concatenated image data 5F of the graphic concatenated image 7F by concatenating the graphic object 7B and the graphic content 7D so that its rank is higher, arranged in upper part (#606).

The image forming apparatus 2 generates the customized document data 59 by combining the text concatenated image data 5E and the graphic concatenated image data 5F into one file (#607), and saves the customized document data 59 (#608).

Alternatively, when the image forming apparatus 2 is requested to transmit a document from the terminal device 3 (NO in #601 and YES in #609), the image forming apparatus 2 transmits the customized document data 59 of the document to the terminal device 3 (#610).

The image forming apparatus 2 appropriately performs the processing in steps #602 to #610, and the processing in step #610 until the service of management and providing the document is terminated.

The terminal device 3 performs processing based on the document display program 30P with the procedures illustrated in FIG. 11.

When the user instructs the terminal device 3 to register the original document 70 (YES in #621), the terminal device 3 uploads the file 51 of the original document 70 to the image forming apparatus 2 (#622).

Alternatively, when the user inputs the document name to browse the original document 70 (NO in #621), the terminal device 3 downloads the customized document data 59 of the customized document 79 corresponding to the original document 70 from the image forming apparatus 2 (#623).

When the customized document data 59 includes the graphic concatenated image data 5F (YES in #624), the terminal device 3 displays a screen constituted by the character string display area 351, the graphic display area 352, and the close button 353 as the document screen 35 (#625).

Then, the terminal device 3 arranges the part of the text concatenated image 7E corresponding to the first page 701 in the character string display area 351, and arranges the part of the graphic content 7D corresponding to the first page 701 in the graphic display area 352 (#626).

Thereafter, when the user flicks or drags the character string display area 351, (YES in #627), the terminal device 3 scrolls the text concatenated image 7E (#628). Then, when the paged to be displayed in the character string display area 351 is changed by scrolling (YES in #629), the terminal device 3 displays, in the graphic display area 352, the part of the graphic concatenated image 7F in the page after the change (#630).

The terminal device 3 appropriately performs the processing in steps #627 to #630 until the user touches the close button 353 (see FIG. 8).

On the other hand, when the downloaded customized document data 59 does not include the graphic concatenated image data 5F (NO in #624), the terminal device 3 displays a screen having no graphic display area 352, that is, a screen constituted by the character string display area 351 and the close button 353 as the document screen 35 (#632).

Then, the terminal device 3 arranges the text concatenated image 7E in the character string display area 351 (#633), and scrolls the text concatenated image 7E in response to the flick or drag until the close button 353 is touched (#634, #635).

Figure 12A:
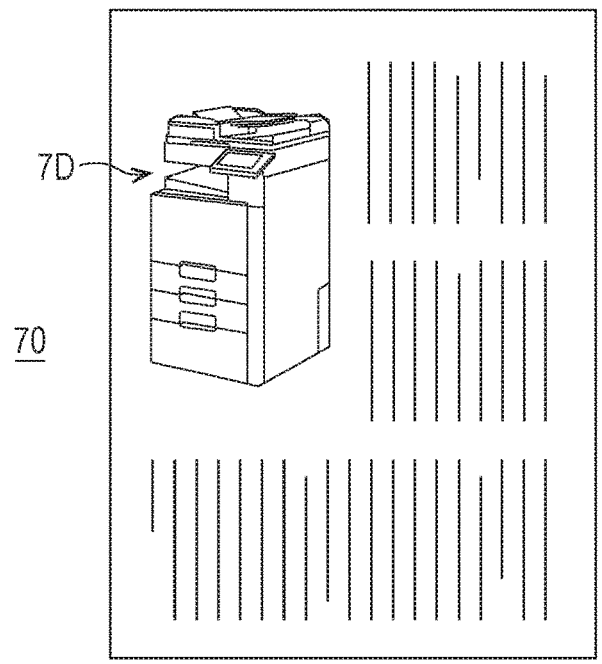
FIGS. 12A and 12B are diagrams illustrating an example of area images extracted each from a modified example of an original document and the original document.
Figure 12B:
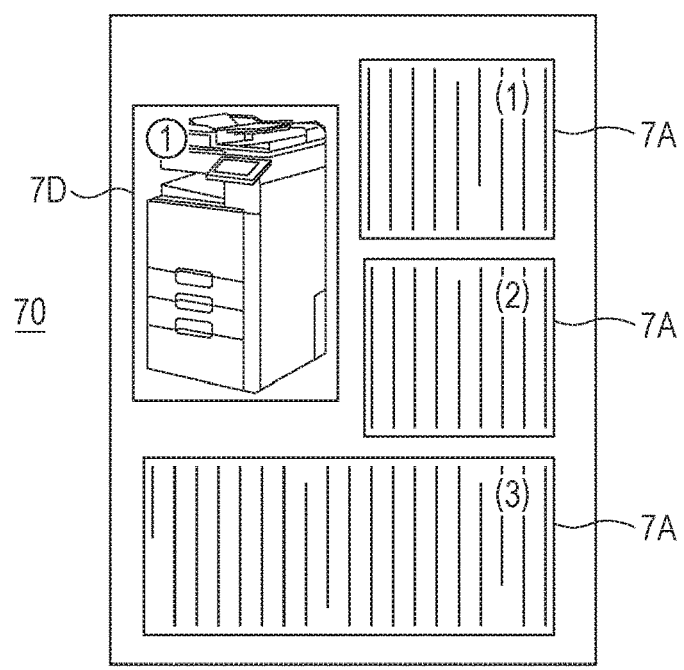
Figure 13:
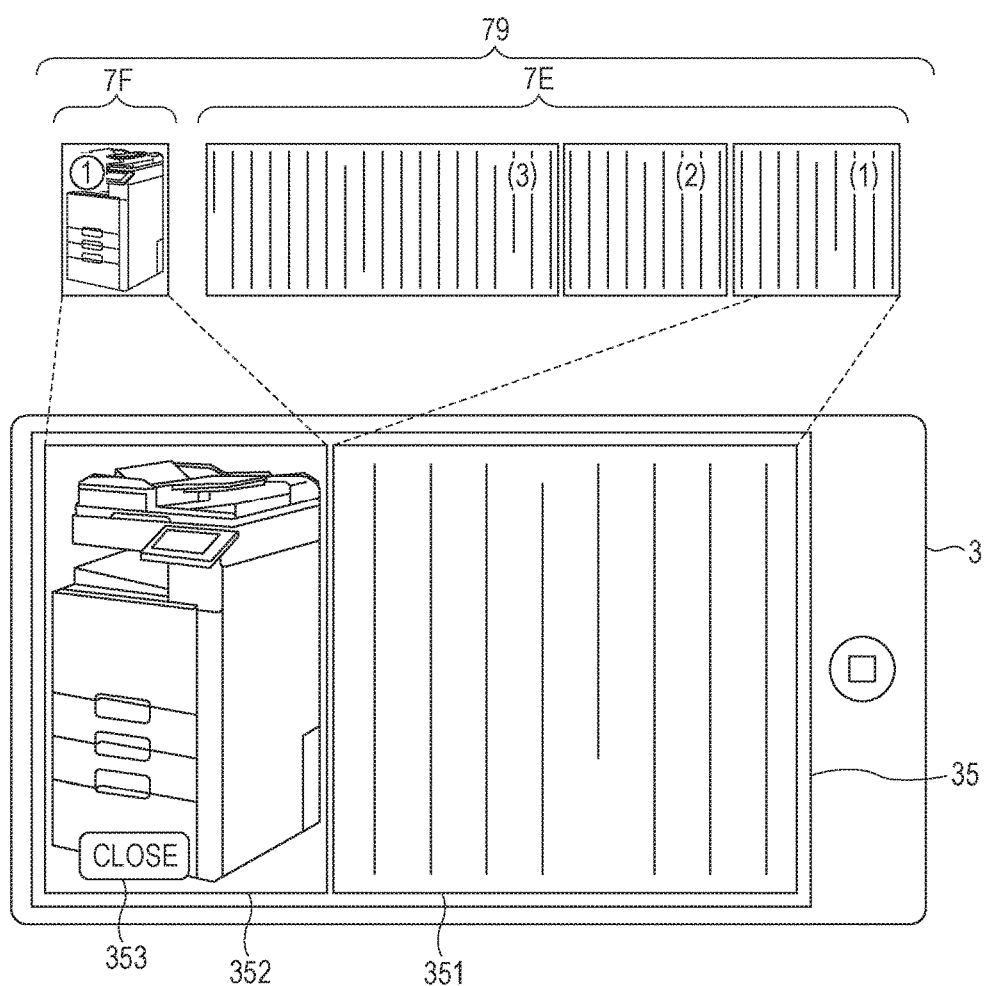
FIG. 13 is a diagram illustrating a modified example of a customized document and a modified example of display of the customized document.

FIGS. 12A and 12B are diagrams illustrating an example of area images extracted each from a modified example of the original document 70 and the original document 70. FIG. 13 is a diagram illustrating a modified example of the customized document 79 and a modified example of display of the customized document 79.

Although the case in which the original document 70 is in a horizontal writing format as illustrated in FIG. 4 has been described in the first embodiment, the customized document 79 can be generated and provided when the original document 70 is in a vertical writing format. The processing to generate and provide the customized document 79 in this case is described below.

The area image extracting unit 202 extracts area images from the original document 70 similarly to the document written horizontally. Instead of the above rules (1-2) and (1-3), based on the following rules (1-2') and (1-3'), the ranks of the text objects 7A and the text content 7C among the extracted area images are determined. The rule (1-1) is used similarly to the document written horizontally. (1-2') With regard to area images arranged in the same page, a higher rank is given to an area image the entire of or a part of which is arranged in the upper side column than the others. (1-3') If there are area images having the same rank based on (1-2'), a higher rank is given to an area image arranged in right part compared to the others.

The ranks of graphic object 7B and the graphic content 7D are determined similarly based on the rules (1-1), (1-2'), and (1-3').

The width adjusting unit 203, the character string area concatenating unit 204, the graphic area concatenating unit 205, and the data combining unit 206 each perform the above processing. Thus, the customized document 79 constituted by the text concatenated image 7E, the graphic concatenated image 7F and the like illustrated in FIG. 13, and the customized document data 59 thereof are generated.

Then, the document display control unit 302 of the terminal device 3 displays, based on the customized document data 59, the screen in which the character string display area 351 and the graphic display area 352 are arranged horizontally as the document screen 35 as illustrated in FIG. 13. Then, the document display control unit 302 horizontally scrolls the text concatenated image 7E in response to flicking or dragging the character string display area 351 in the horizontal direction.

Although the customized document data 59 is transmitted to the terminal device 3 in the first embodiment, the original document data 50 may be transmitted when the terminal device 3 is a device having a large display surface size, such as a tablet computer or a personal computer. The display surface size can be determined by acquiring a user agent from the terminal device 3.

The ranks of the area images are determined based on the rules (1-1), (1-2), and (1-3), or the rules of (1-1), (1-2'), and (1-3') in the first embodiment, but may be determined by other rules.

For example, when a document is written horizontally, the rules may be (1-2") instead of (1-2) or (1-2'), and (1-3") instead of (1-3) or (1-3'). (1-2") With regard to area images arranged in the same page, a higher rank is given to an area image the entire of or a part of which is arranged in an upper part than the others. (1-3") If there are area images having the same rank based on (1-2') a higher rank is given to an area image arranged in a left part compared to the others.

The combination of these rules are based on the order in which a person reads a document. The ranks may be determined by preparing a plural of combinations of rules and selecting the rule of the combination by the user.

The customized document data 59 is immediately generated from the original document data 50 when the original document data 50 is uploaded in the first embodiment, but may be generated when the terminal device 3 requests the image forming apparatus 2 to provide the original document 70 or the customized document 79.

Second Embodiment

Figure 14:
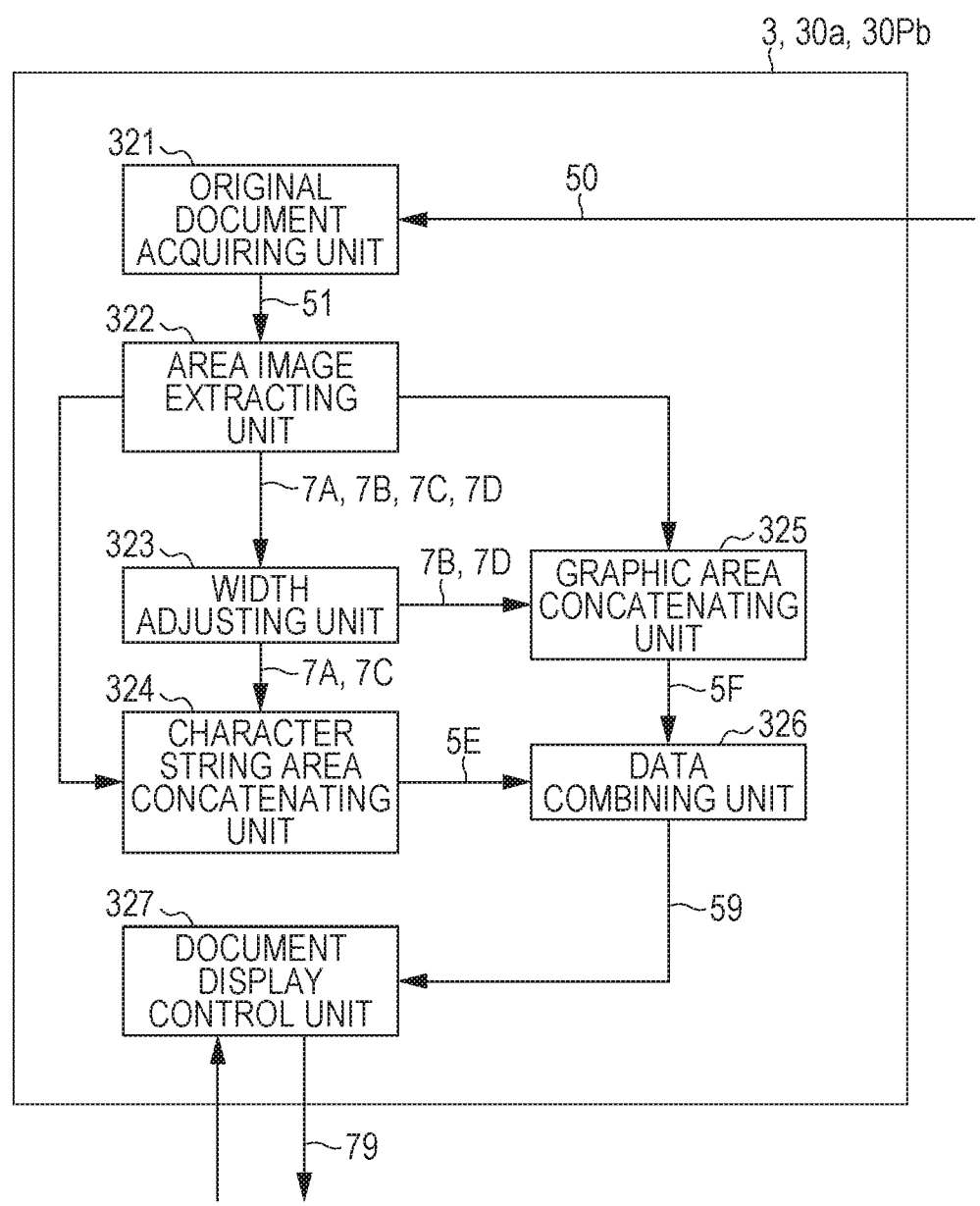
FIG. 14 is a diagram illustrating an example of a functional configuration of a terminal device in a second embodiment.

FIG. 14 is a diagram illustrating an example of a functional configuration of a terminal device 3 in a second embodiment.

A customized document 79 is generated by an image forming apparatus 2 from an original document 70 in the first embodiment, but is generated by the terminal device 3 in the second embodiment.

An entire configuration of a document display system 1 is the same as that in the first embodiment, and is illustrated in FIG. 1. The hardware configurations of the image forming apparatus 2 and the terminal device 3 are the same as those in the first embodiment, and are illustrated in FIGS. 2 and 3.

However, when the terminal device 3 specifies a document name, the image forming apparatus 2 transmits, to the terminal device 3, original document data 50 corresponding to the document name. The customized document 79 is not generated.

Furthermore, a document conversion display program 30Pb is stored instead of a document display program 30P in a ROM 30c or a flash memory 30d of the terminal device 3.

According to the document conversion display program 30Pb, it is possible to implement functions of an original document acquiring unit 321, an area image extracting unit 322, a width adjusting unit 323, a character string area concatenating unit 324, a graphic area concatenating unit 325, a data combining unit 326, and a document display control unit 327, which are illustrated in FIG. 14. These functions are described below. The descriptions which overlap with the first embodiment are omitted.

The original document acquiring unit 321 acquires the original document data 50 of the original document 70 by downloading the data from the image forming apparatus 2 or reading the data from the flash memory 30d.

The functions of the area image extracting unit 322, the width adjusting unit 323, the character string area concatenating unit 324, the graphic area concatenating unit 325, and the data combining unit 326 are the same as the functions of the area image extracting unit 202, the width adjusting unit 203, the character string area concatenating unit 204, the graphic area concatenating unit 205, and the data combining unit 206 in the first embodiment (see FIG. 5) respectively. As the result of the processing of the area image extracting unit 322 to the data combining unit 326, customized document data 59 is obtained similarly to the first embodiment.

The document display control unit 327 displays, based on the customized document data 59 obtained by the area image extracting unit 322 to the data combining unit 326, a document screen 35 on a touch panel display 30e similarly to the first embodiment.

Figure 15:
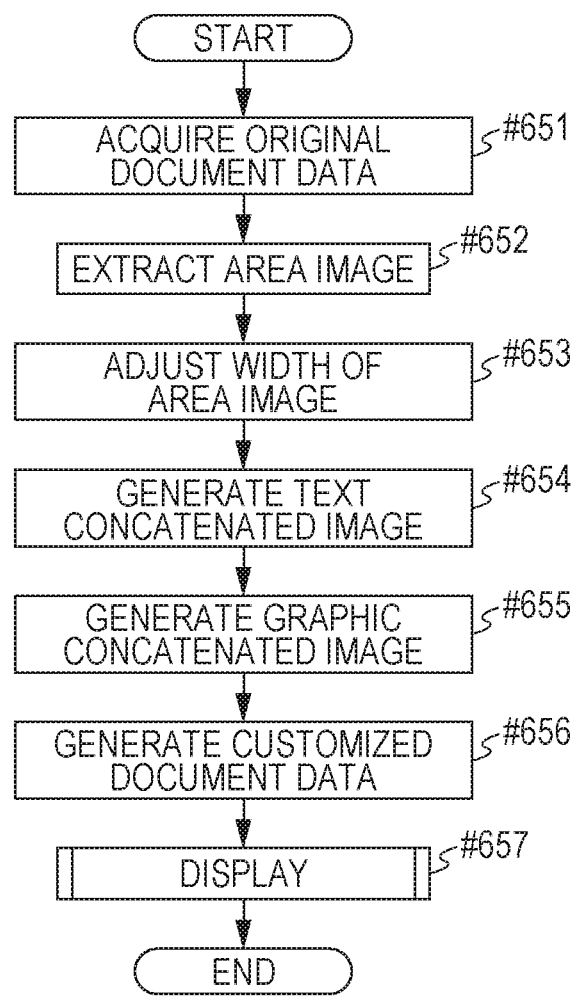
FIG. 15 is a flowchart explaining processing of the terminal device in the second embodiment.

FIG. 15 is a flowchart explaining processing of the terminal device 3 in the second embodiment.

The terminal device 3 performs processing based on the document conversion display program 30Pb with the procedures illustrated in FIG. 15.

The terminal device 3 acquires the original document data 50 of the original document 70 from the image forming apparatus 2, a USB memory, or the like (#651).

Furthermore, the terminal device 3 extracts, based on the original document data 50, area images (#652), adjusts the widths of the area images (#653), generate text concatenated image data 5E of a text concatenated image 7E (#654), and generates graphic concatenated image data 5F of a graphic concatenated image 7F (#655). The terminal device 3 generates the customized document data 59 of the customized document 79 using the text concatenated image data 5E, the graphic concatenated image data 5F, and the like (#656). The processing in steps #652 to #656 is the same as the processing in steps #603 to #607 in FIG. 10.

Then, the terminal device 3 performs, based on the customized document data 59, the processing to display the customized document 79 (#657). This processing is the same as the processing in steps #624 to #646 in FIG. 11.

According to the first embodiment and the second embodiment, the customized document 79 is generated from the original document 70, and provided to the terminal device 3. The customized document 79 is that the multiple text objects 7A and multiple items of the text content 70 included in the original document 70 are arranged in the reading direction and the reading order in a row. Thus, when the size of the touch panel display 30e of the terminal device 3 is small, it is possible for a user to browse the content of the original document 70 more easily than before.

Furthermore, the text object 7A and the text content 7C are displayed in the full width of display surface of the touch panel display 30e, and it is not necessary to enlarge or reduce each of the text object 7A and the text content 7C.

Moreover, the graphic object 7B or the graphic content 7D in the same page as the page displayed in the character string display area 351 is displayed in the graphic display area 352. Thus, the graphic object 7B or the graphic content 7D in the same page can be immediately browsed without the operation to the graphic display area 352.

Furthermore, the terminal device 3 does not concatenate area images every time when a previous or following area image is to be displayed after a currently displayed area image in response to a scroll operation, but prepares data in which these area images are concatenated in advance (the customized document data 59). Thus, it is possible to scroll these area images more smoothly.

The positional relation between the character string display area 351 and the graphic display area 352 in the document screen 35 is not limited to the example in FIG. 8 or FIG. 9. In other words, in the first embodiment and the second embodiment, when the document is written horizontally, the graphic display area 352 is arranged above the character string display area 351, but may be arranged under the character string display area 351, or at the right side or the left side of the character string display area 351. When the document is written vertically, the graphic display area 352 is arranged at the left side of the character string display area 351, but may be arranged above or under the character string display area 351, or the right side of the character string display area 351.

Figure 16:
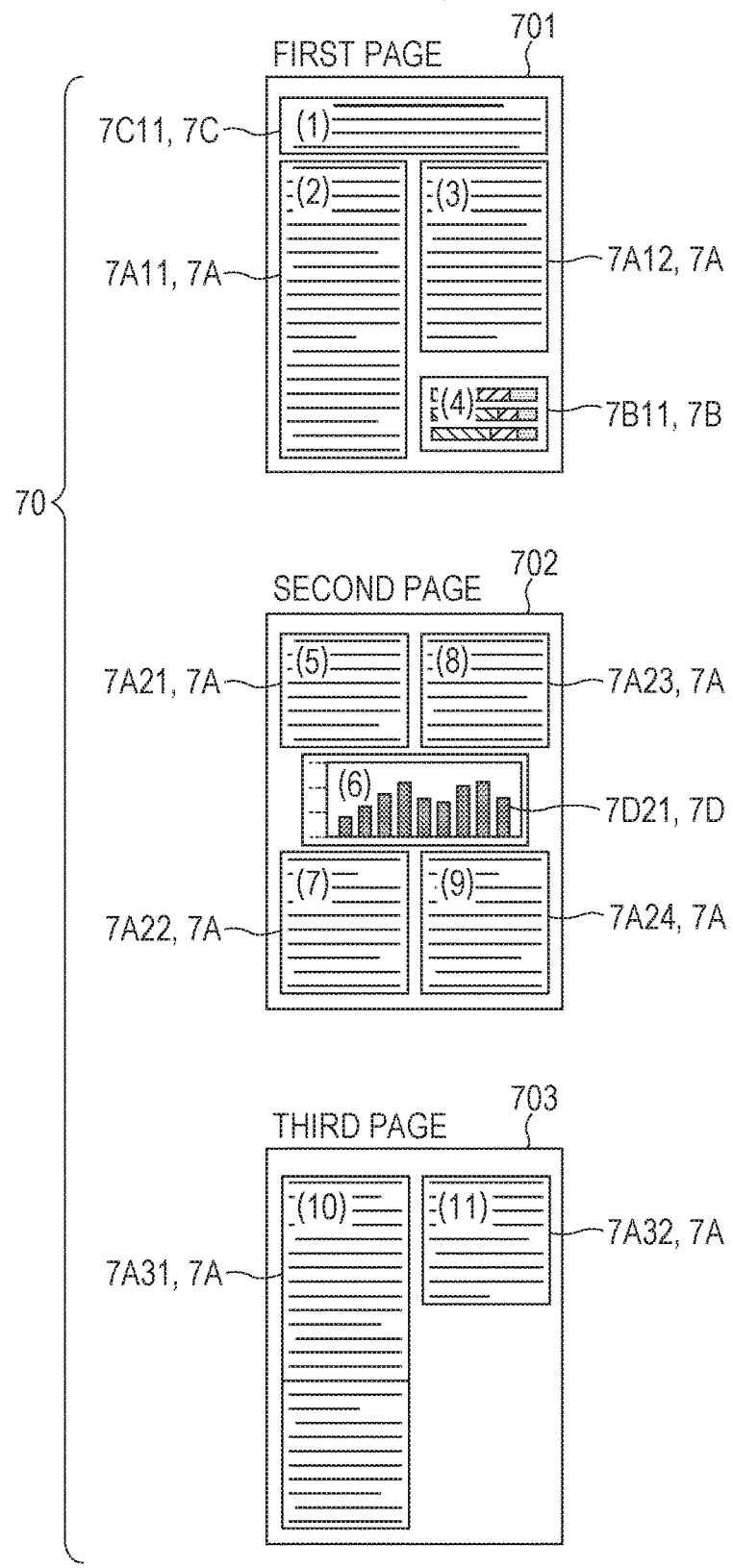
FIG. 16 is a diagram illustrating a modified example of ranking area images.
Figure 17:
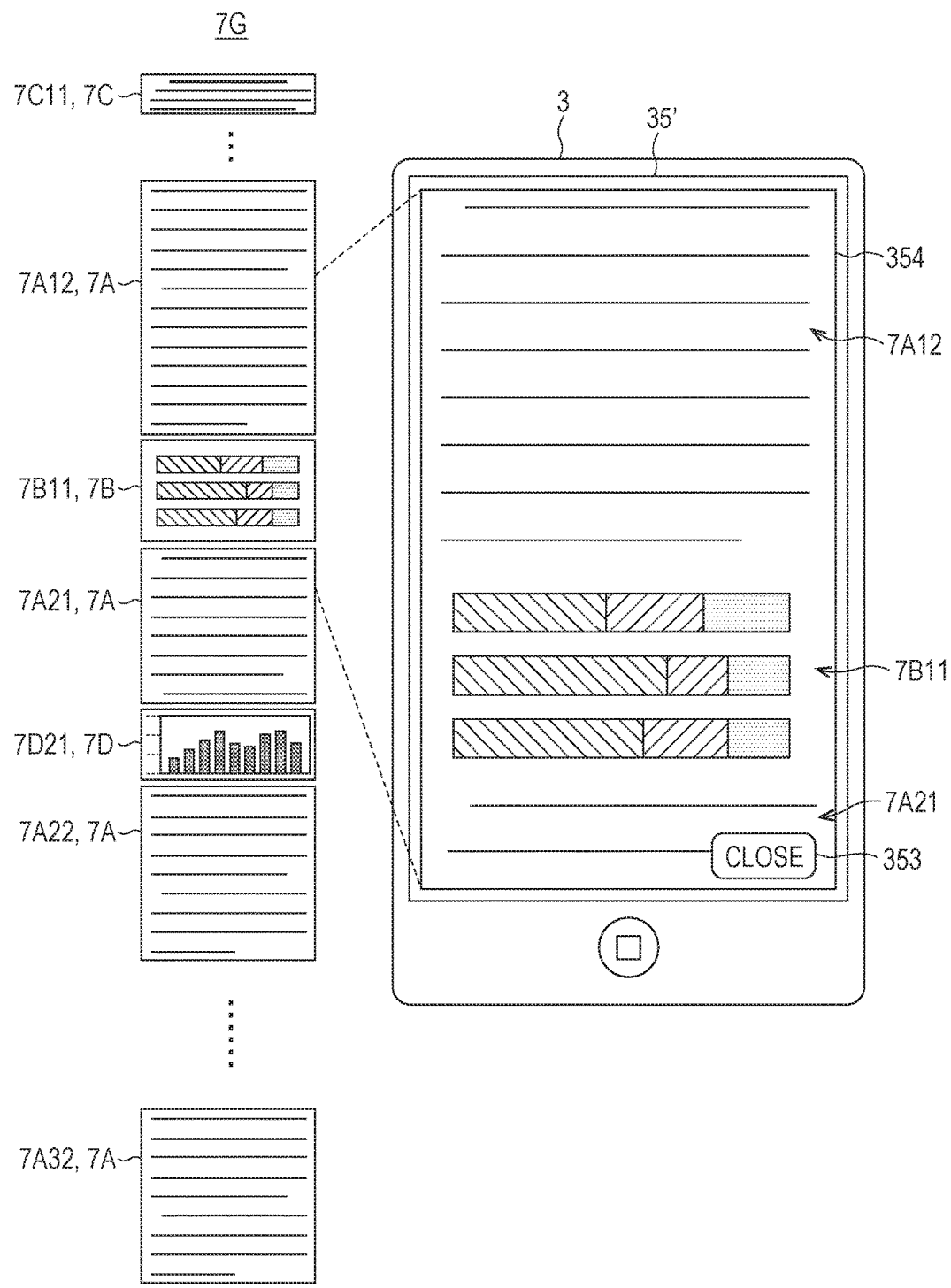
FIG. 17 is a diagram illustrating an example of display of a concatenated image.
Figure 18:
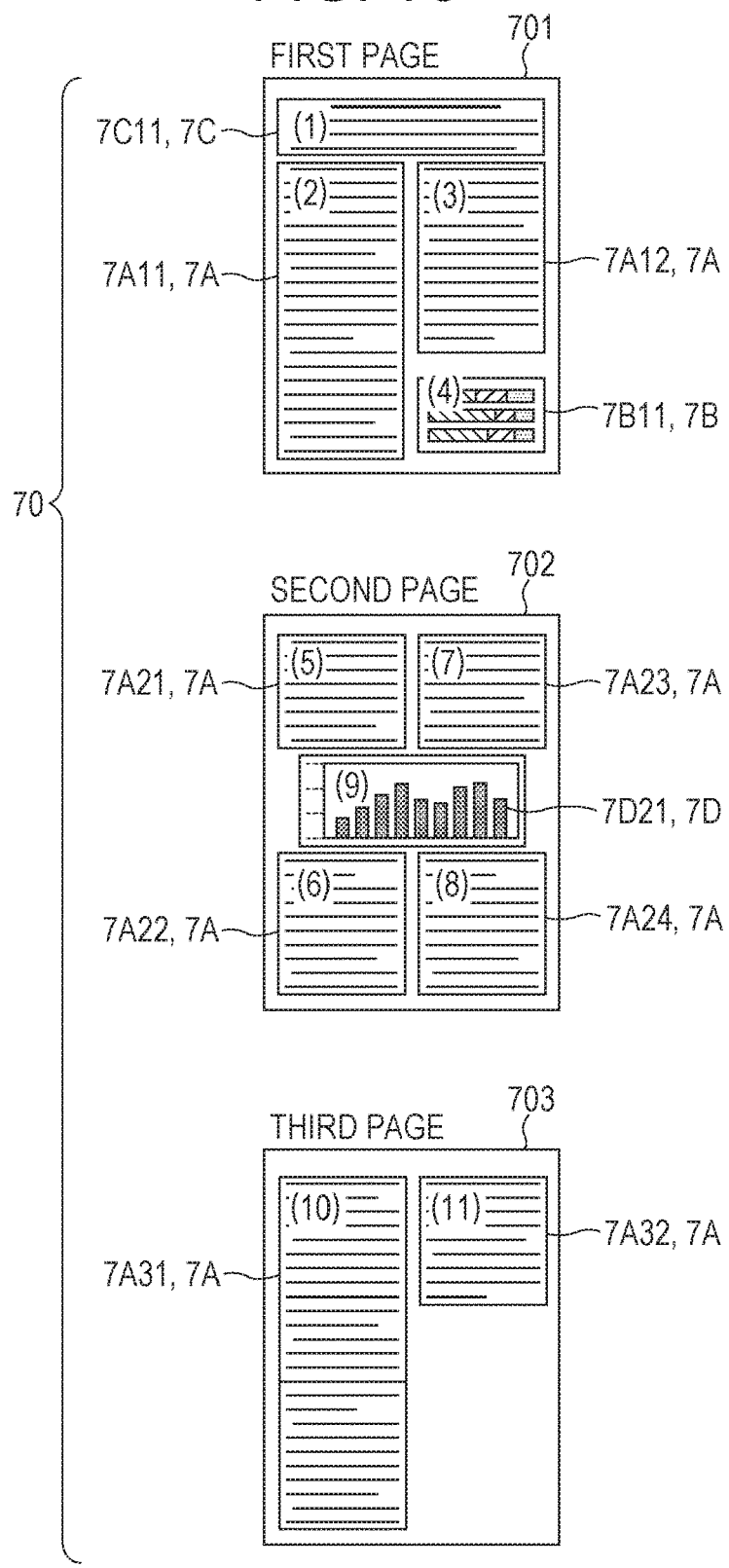
FIG. 18 is a diagram illustrating a modified example of ranking area images.
Figure 19:
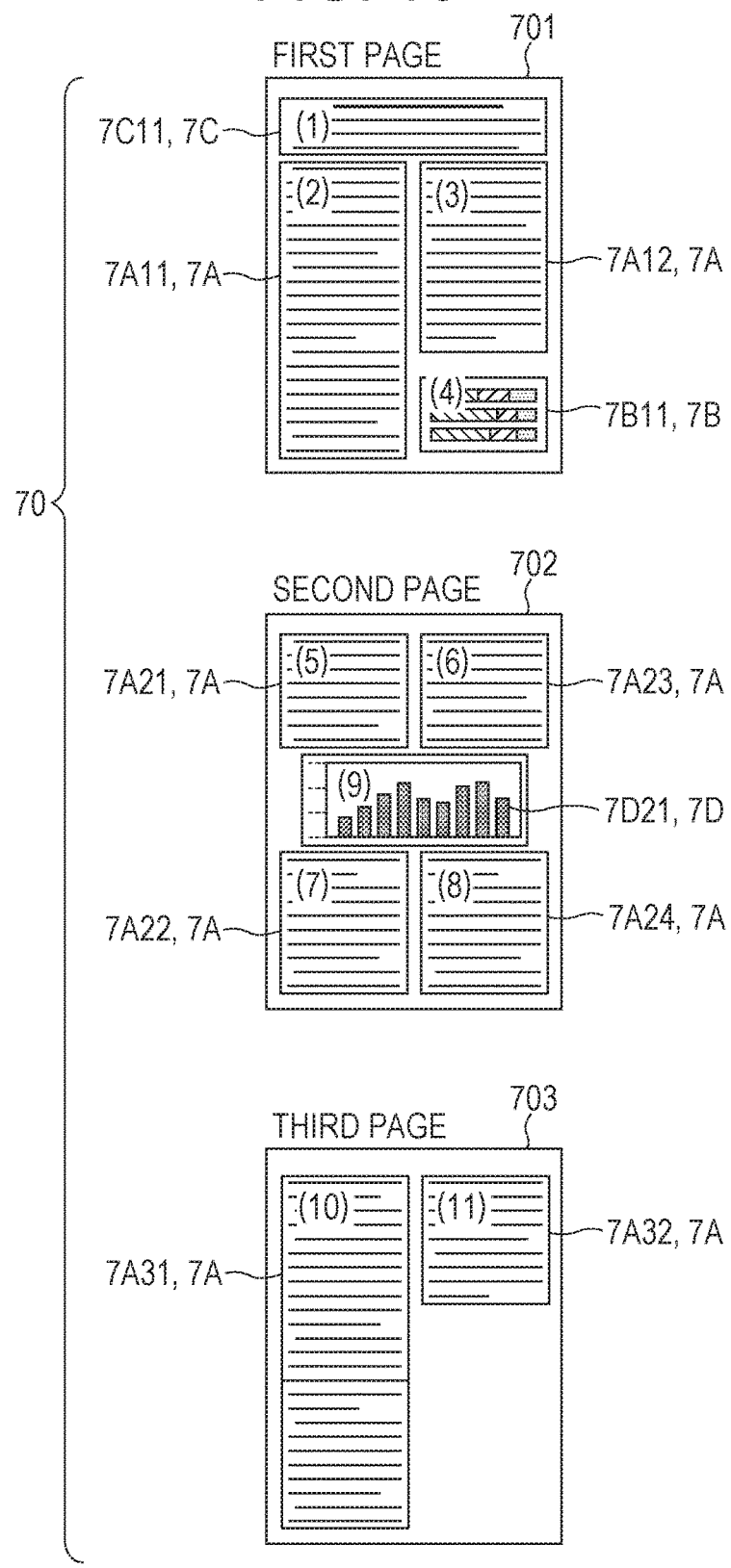
FIG. 19 is a diagram illustrating a modified example of ranking area images.

FIG. 16 is a diagram illustrating of a modified example of ranking area images 711 to 714, 721 to 725, and 731 to 732. FIG. 17 is a diagram illustrating an example of display of a concatenated image 70. FIGS. 18 and 19 are diagrams illustrating of modified examples of ranking the area images 711 to 714, 721 to 725, and 731 to 732.

In the first embodiment and the second embodiment, a group of the text object 7A and the text content 7C and a group of the graphic object 7B and the graphic content 7D are separately ranked. However, the ranking may be performed as illustrated in FIG. 16 without the group.

In this case, instead of the text concatenated image 7E and the graphic concatenated image 7F, the concatenated image 7G illustrated in FIG. 17 and concatenated image data to display the concatenated image 7G are generated. Then, as illustrated in FIG. 17, a document screen 35' having a display area 354 is displayed instead of the character string display area 351 and the graphic display area 352, and the concatenated image 7G is arranged in the display area 354.

Alternatively, with regard to the area images in the same page, the ranks of the text object 7A and the text content 7C may be higher than the ranks of the graphic object 7B and the graphic content 7D regardless of the arranged position as illustrated in FIG. 18 or FIG. 19. The original document data 50 may be acquired by a scan unit 20i.

In addition, the entire document display system 1, the configurations of the units of the image forming apparatus 2 or the terminal device 3, the processing contents, the processing orders, the data configurations, and the screen configurations can be changed according to the scope of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A document generation system which generates, from a first document having a plurality of pages in which a plurality of text groups constituted by a plurality of lines arranged in a first direction are arranged in a second direction different from the first direction and in which a plurality of graphics are arranged, a second document, the document generation system comprising:
   an image forming apparatus, the image forming apparatus comprising a hardware processor which, under control of a program stored in a memory, executes processes comprising:
      an extracting process to extract the plurality of text groups and the plurality of graphics from the first document;
      a ranking process to rank each of the plurality of text groups and each of the plurality of graphics which are extracted according to an order in which a person reads the first document; and
      a generating process to generate, as the second document, text concatenated data in which each of the plurality of text groups is arranged one by one in the first direction in ascending order as ranked in the ranking process, and graphic concatenated data which is separated from the plurality of text groups and in which each of the plurality of graphics is arranged one by one in the first direction in ascending order as ranked in the ranking process; and
   a portable terminal device, the portable terminal device comprising a display and a hardware processor which, under control of a program stored in a memory, executes processes comprising:
      an acquiring process to acquire the second document from the image forming apparatus; and
      a display process to control the display to display the second document acquired in the acquiring process by displaying a screen in which a first display area for displaying the plurality of text groups displayed in the text concatenated data and a second display area for displaying the plurality of graphics displayed in the graphic concatenated data are arranged independently,
   wherein the display process controls the display to display a graphic, among the plurality of graphics, belonging to a second page including a second text group among the plurality of pages, in the second display area, in a case in which a text group which is displayed in the first display area among the plurality of text groups is changed from a first text group included in a first page different from the second page to the second text group.

2. The document generation system according to claim 1, wherein the generating process generates the second document by enlarging or reducing each of the plurality of text groups so as to be matched with a length of the second direction.

3. The document generation system according to claim 1, wherein the display process controls the display to display the second document by displaying the first display area and the second display area with the first display area and the second display area being independently scrollable.

4. A document generation method of a document generation system for generating, from a first document including a plurality of pages in which a plurality of text groups constituted by a plurality of lines arranged in a first direction are arranged in a second direction different from the first direction and in which a plurality of graphics are arranged, a second document, the document generation system comprising an image forming apparatus and a portable terminal device, and the document generation method comprising:
   extracting, by the image forming apparatus, the plurality of text groups and the plurality of graphics from the first document;

ranking, by the image forming apparatus, each of the plurality of text groups and each of the plurality of graphics which are extracted according to an order in which a person reads the first document;

generating, by the image forming apparatus, as the second document, text concatenated data in which each of the plurality of text groups is arranged one by one in the first direction in ascending order as ranked by the ranking, and graphic concatenated data which is separated from the plurality of text groups and in which each of the plurality of graphics is arranged one by one in the first direction in ascending order as ranked by the ranking;

acquiring, by the portable terminal device, the second document from the image forming apparatus; and displaying, on a display of the portable terminal device, the second document acquired by the acquiring by displaying a screen in which a first display area for displaying the plurality of text groups displayed in the text concatenated data and a second display area for displaying the plurality of graphics displayed in the graphic concatenated data are arranged independently, wherein the displaying displays a graphic, among the plurality of graphics, belonging to a second page including a second text group among the plurality of pages, in the second display area, in a case in which a text group which is displayed in the first display area among the plurality of text groups is changed from a first text group included in a first page different from the second page to the second text group.

5. A non-transitory recording medium storing a computer readable program which controls a computer of an image forming apparatus to generate, from a first document including a plurality of pages in which a plurality of text groups constituted by a plurality of lines arranged in a first direction are arranged in a second direction different from the first direction and in which a plurality of graphics are arranged, a second document, the image forming apparatus being connectable with a portable terminal device, and the program being executable to control the computer to execute processes comprising:

extracting the plurality of text groups and the plurality of graphics from the first document;

ranking each of the plurality of text groups and each of the plurality of graphics which are extracted according to an order in which a person reads the first document;

generating, as the second document, text concatenated data in which each of the plurality of text groups is arranged one by one in the first direction in ascending order as ranked by the ranking, and graphic concatenated data which is separated from the plurality of text groups and in which each of the plurality of graphics is arranged one by one in the first direction in ascending order as ranked by the ranking; and transmitting, to the portable terminal device, the second document generated by the generating for display of the second document on a display of the portable terminal device, the second document being displayed on the display of the portable terminal device by (i) displaying a screen in which a first display area for displaying the plurality of text groups displayed in the text concatenated data and a second display area for displaying the plurality of graphics displayed in the graphic concatenated data are arranged independently, and (ii) displaying a graphic, among the plurality of graphics, belonging to a second page including a second text group among the plurality of pages, in the second display area, in a case in which a text group which is displayed in the first display area among the plurality of text groups is changed from a first text group included in a first page different from the second page to the second text group.

6. The non-transitory recording medium according to claim 5, wherein the transmitting transmits the second document to the portable terminal device when the portable terminal device specifies the first document from which the second document is generated.

7. The non-transitory recording medium according to claim 5, wherein the generating generates the second document by enlarging or reducing each of the plurality of text groups so as to be matched with a length of the second direction.

8. The non-transitory recording medium according to claim 6, wherein the second document is displayed on the display of the portable terminal device by displaying the first display area and the second display area such that the first display area and the second display area are independently scrollable.

9. A portable terminal device which is connectable with an image forming apparatus which generates, from a first document including a plurality of pages in which a plurality of text groups constituted by a plurality of lines arranged in a first direction are arranged in a second direction different from the first direction and in which a plurality of graphics are arranged, a second document, the portable terminal device comprising:

a display; and a hardware processor which, under control of a program stored in a memory, executes processes comprising:

an acquiring process to acquire, from the image forming apparatus, the second document generated by the image forming apparatus, the second document including text concatenated data in which each of the plurality of text groups is arranged one by one in the first direction according to an order in which a person reads the first document, and graphic concatenated data which is separated from the plurality of text groups and in which each of the plurality of graphics is arranged one by one in the first direction according to an order in which a person reads the first document; and a display process to control the display to display the second document acquired in the acquiring process by displaying a screen in which a first display area for displaying the plurality of text groups displayed in the text concatenated data and a second display area for displaying the plurality of graphics displayed in the graphic concatenated data are arranged independently, wherein the display process controls the display to display a graphic, among the plurality of graphics, belonging to a second page including a second text group among the plurality of pages, in the second display area, in a case in which a text group which is displayed in the first display area among the plurality of text groups is changed from a first text group included in a first page different from the second page to the second text group.

10. A non-transitory recording medium storing a computer readable program which controls a computer of a portable terminal including a display, the portable terminal device being connectable with an image forming apparatus which generates, from a first document including a plurality of pages in which a plurality of text groups constituted by a plurality of lines arranged in a first direction are arranged in a second direction different from the first direction and in which a plurality of graphics are arranged, a second document, and the program being executable to control the computer to execute processes comprising:

acquiring, from the image forming apparatus, the second document generated by the image forming apparatus, the second document including text concatenated data in which each of the plurality of text groups is arranged one by one in the first direction according to an order in which a person reads the first document, and graphic concatenated data which is separated from the plurality of text groups and in which each of the plurality of graphics is arranged one by one in the first direction according to an order in which a person reads the first document; and displaying, on the display, the second document acquired in the acquiring by displaying a screen in which a first display area for displaying the plurality of text groups displayed in the text concatenated data and a second display area for displaying the plurality of graphics displayed in the graphic concatenated data are arranged independently, wherein the displaying comprises controlling the display to display a graphic, among the plurality of graphics, belonging to a second page including a second text group among the plurality of pages, in the second display area, in a case in which a text group which is displayed in the first display area among the plurality of text groups is changed from a first text group included in a first page different from the second page to the second text group.

* * * * *